(12) United States Patent
Lim et al.

(10) Patent No.: US 11,384,836 B2
(45) Date of Patent: Jul. 12, 2022

(54) PISTON FOR COMPRESSOR

(71) Applicant: LG Electronics Inc., Seoul (KR)

(72) Inventors: Youngkyun Lim, Seoul (KR);
Jeongwoo Kim, Seoul (KR); Donghan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/117,823

(22) Filed: Dec. 10, 2020

(65) Prior Publication Data

US 2021/0180693 A1 Jun. 17, 2021

(30) Foreign Application Priority Data

Dec. 11, 2019 (KR) .................. 10-2019-0164530

(51) Int. Cl.
*F16J 1/02* (2006.01)
*F16J 1/00* (2006.01)
*F25B 31/02* (2006.01)

(52) U.S. Cl.
CPC ............... *F16J 1/02* (2013.01); *F16J 1/005* (2013.01); *F25B 31/023* (2013.01)

(58) Field of Classification Search
CPC ...................................... F16J 1/02; F16J 1/005
See application file for complete search history.

(56) References Cited

U.S. PATENT DOCUMENTS 7,988,430 B2 * 8/2011 Kang .................. F04B 39/126
417/417
8,801,409 B2 * 8/2014 Lilie ..................... F04B 39/14
417/553
9,989,052 B2 * 6/2018 Park ...................... C23C 28/32
(Continued)

FOREIGN PATENT DOCUMENTS

EP 2960504 4/2015
EP 3242025 5/2017
(Continued)

OTHER PUBLICATIONS

KR Office Action in Korean Appln. No. 10-2019-0164530, dated Sep. 18, 2020, 14 pages (with English translation).
(Continued)

*Primary Examiner* — Thomas E Lazo
(74) *Attorney, Agent, or Firm* — Fish & Richardson P.C.

(57) ABSTRACT

A piston for a compressor includes a bearing portion having a cylindrical shape to define a suction space into which refrigerant is accommodated therein, the bearing portion being provided with a bearing surface facing an inner circumferential surface of the cylinder, a head portion coupled to a front opening of the bearing portion and provided with a plurality of suction ports which communicate with the suction space, the head portion having a compression surface configured to face a compression space to compress the refrigerant in the compression space, and a flange portion coupled to a rear opening of the bearing portion and provided with a through-passage through which the refrigerant is introduced from a muffler unit to the suction space, the flange portion being coupled to a driving portion to transmit driving force to the piston. The bearing surface is subjected to a surface treatment to improve abrasion resistance.

18 Claims, 15 Drawing Sheets

(56) References Cited

U.S. PATENT DOCUMENTS

| | | | |
|---|---|---|---|
| 10,941,758 B2* | 3/2021 | Lee | C23C 28/343 |
| 2004/0047751 A1* | 3/2004 | Kim | F04B 39/102 |
| | | | 417/417 |
| 2007/0166176 A1* | 7/2007 | Kang | F04B 39/0005 |
| | | | 417/417 |
| 2015/0004021 A1* | 1/2015 | Kang | F04B 39/122 |
| | | | 417/410.1 |
| 2017/0321673 A1* | 11/2017 | Lee | F04B 39/123 |

FOREIGN PATENT DOCUMENTS

| | | |
|---|---|---|
| KR | 1020070076582 | 7/2007 |
| KR | 101454550 | 10/2014 |
| KR | 101457664 | 11/2014 |
| KR | 1020180089747 | 8/2018 |

OTHER PUBLICATIONS

Extended European Search Report in EP Appln. No. 20213041.5, dated Feb. 5, 2021, 4 pages.

* cited by examiner

PISTON FOR COMPRESSOR

CROSS-REFERENCE TO RELATED APPLICATION

This application is based on and claims the benefit of priority to Korean Patent Application No. 10-2019-0164530, filed on Dec. 11, 2019, in the Korean Intellectual Property Office, the disclosure of which is incorporated herein in its entirety by reference.

TECHNICAL FIELD

The present disclosure relates to a compressor. More specifically, the present disclosure relates to a piston used in a linear compressor that compresses a refrigerant by a linear reciprocating motion of the piston.

BACKGROUND

In general, compressors refer to devices configured to compress a working fluid such as air or a refrigerant by receiving power from a power generating device such as a motor or a turbine. The compressors are widely applied to the whole industry or the home appliances, in particular, a steam compression refrigeration cycle (hereinafter, referred to as a 'refrigeration cycle').

The compressors are largely classified into reciprocating compressors, rotary compressors, and scroll compressors according to a manner of compressing the refrigerant.

The reciprocating compressor uses a manner in which a compression space is defined between a piston and a cylinder, and the piston linearly reciprocates to compress a fluid, the rotary compressor uses a manner in which a fluid is compressed by a roller that eccentrically rotates inside a cylinder, and the scroll compressor uses a manner in which a pair of scrolls, each of which has a spiral shape, are engaged with each other to rotate so as to compress a fluid.

Recently, among the reciprocating compressors, the use of a linear compressor using a linear reciprocating motion without a crankshaft is gradually increasing. The linear compressor has the advantage of having a relatively simple structure and improving efficiency of the compressor because there is a little mechanical loss associated with converting rotational motion to linear reciprocating motion.

In the linear compressor, a cylinder is disposed inside a casing defining a closed space to provide a compression chamber, and a piston covering the compression chamber is configured to reciprocate inside the cylinder. In the linear compressor, a fluid in the sealed space is suctioned into the compression chamber while the piston is disposed at a bottom dead center (BDC), and the fluid in the compression chamber is suctioned into the compression chamber while the piston is disposed at a top dead center (TDC). Here, the processes of compressing and discharging the fluid is repeatedly performed.

A piston of a linear compressor is disclosed in Korean Patent Registration No. 10-1454550 (Prior Art 1). The compressor disclosed in the prior art has a feature in which a surface treatment such as DLC coating is performed on the outside of the piston to prevent abrasion or damage of components.

However, in the prior art 1, an unnecessary space may be occupied because a flange portion in addition to a bearing portion required for the surface treatment has to be inserted into a coating equipment so as to perform the surface treatment on the piston having an integral structure.

In addition, since a head portion of the piston is blocked when the component is fixed in the coating equipment, a separate zigzag has to be used, and thus, labor costs and time are wasted.

In addition, a plasma interference may be highly likely to occur at a boundary between the bearing portion and the flange portion, and generation of plasma may adversely affect the DLC coating properties.

In addition, when the piston support is assembled through bolt coupling, an assembly tolerance may occur, and thus, costs may increase due to the additional manufacturing process.

A separable piston in which a head portion and a skirt portion are coupled to each other is disclosed in U.S. Pat. No. 8,801,409 (Prior Art 2). Due to this feature, material consumption during processing may be reduced to save processing costs.

However, according to the prior art 2, when the head portion is coupled to the skirt portion, a press-fitting method has to be performed. Here, the skirt portion of the piston may be damaged during the press-fitting. In addition, in the case of the press-fitting, a fine gap may occur. Thus, when a refrigerant leaks through the gap, compression efficiency may be deteriorated.

PRIOR ART DOCUMENT (Patent Document 1) Korean Patent Registration No. 10-1454550 B (Registered on Oct. 17, 2014)
(Patent Document 2) U.S. Pat. No. 8,801,409 B (Registered on Aug. 12, 2014)

SUMMARY

Embodiments provide a piston used in a compressor, in which a surface treatment is performed on only a bearing portion having a tube shape.

Embodiments also provide a piston used in a compressor, in which a bearing portion is coupled using a bonding process rather than a press-fitting process.

Particular implementations of the present disclosure provide a piston for a compressor. The piston may include a bearing portion, a head portion, and a flange portion. The bearing portion may define a suction space configured to receive refrigerant, and may include a bearing surface facing an inner circumferential surface of the cylinder. The head portion may be coupled to a first opening of the bearing portion and may define a plurality of suction ports that fluidly communicate with the suction space. The head portion may have a compression surface that faces a compression space. The head portion may be configured to compress the refrigerant in the compression space. The flange portion may be coupled to a second opening of the bearing portion and may define a passage through which the refrigerant is introduced from a muffler to the suction space. The flange portion may be coupled to a driver and configured to transmit a driving force from the driver to the piston. The second opening of the bearing portion may be disposed opposite to the first opening of the bearing portion. The bearing surface may be treated to improve abrasion resistance.

In some implementations, the piston can optionally include one or more of the following features. The bearing portion may be bonded to the head portion and the flange portion. An adhesive may be disposed at an interface between the bearing portion and the head portion or at an interface between the bearing portion and the flange portion.

The adhesive may include an anaerobic adhesive or an epoxy adhesive. The bearing surface of the bearing portion may be laminated with a surface treatment layer configured to improve the abrasion resistance. The surface treatment layer may include one or more of diamond like carbon (DLC), Teflon (PTFE), a nickel-phosphorus alloy material, and an anodizing layer. An outer circumferential surface of the head portion may contact an inner circumferential surface of the bearing portion. The compression surface of the head portion may be flush with an end surface of the bearing portion at the first opening of the bearing portion. The plurality of suction ports may be spaced radially inward from the inner circumferential surface of the bearing portion. The plurality of suction ports may be partially defined by the inner circumferential surface of the bearing portion. The plurality of suction ports may be recessed inward from the outer circumferential surface of the head portion in a radial direction. The bearing portion may include a seating portion that is defined at the inner circumferential surface of the bearing portion and that receives the head portion. The seating portion may include a stepped portion on which the head portion is seated. The head portion may include an insertion portion and a front seating portion. The insertion portion may be inserted to the first opening of the bearing portion and coupled to the bearing portion. The front seating portion may extend radially outward from the insertion portion and may be seated on the end surface of the bearing portion.

Particular implementations of the present disclosure provide a piston for a compressor, which may include a body portion and a bearing portion. The body portion may include a cylindrical portion that defines a suction space configured to receive refrigerant. The bearing portion may have an inner diameter corresponding to an outer diameter of the body portion. The bearing portion may surround an outer circumferential surface of the cylindrical portion. The bearing portion may include a bearing surface facing an inner circumferential surface of the cylinder. The bearing surface may be treated to improve abrasion resistance.

In some implementations, the piston can optionally include one or more of the following features. The bearing portion may be bonded to the body portion. An adhesive may be disposed at an interface between the bearing portion and the body portion. The adhesive may include an anaerobic adhesive or an epoxy adhesive. The bearing surface of the bearing portion may be laminated with a surface treatment layer configured to improve the abrasion resistance. The surface treatment layer may include one or more of diamond like carbon (DLC), Teflon (PTFE), a nickel-phosphorus alloy material, and an anodizing layer. The piston may include a head portion that is integral with the body portion and defines a plurality of suction ports that fluidly communicate with the suction space. The head portion may have a compression surface that faces a compression space. The head portion may be configured to compress the refrigerant in the compression space. The piston may include a head portion that is integral with the bearing portion and defines a plurality of suction ports that fluidly communicate with the suction space. The head portion may have a compression surface that faces a compression space. The head portion may be configured to compress the refrigerant in the compression space.

In one embodiment, a piston for a compressor, the piston being configured to compress and discharge a refrigerant suctioned into a cylinder, includes: a bearing portion having a cylindrical shape to define a suction space into which the suctioned refrigerant is accommodated therein, the bearing portion being provided with a bearing surface facing an inner circumferential surface of the cylinder; a head portion coupled to a front opening of the bearing portion and provided with a plurality of suction ports which communicate with the suction space, the head portion having a compression surface configured to face a compression space to compress the refrigerant in the compression space; and a flange portion coupled to a rear opening of the bearing portion and provided with a through-passage through which the refrigerant is introduced from a muffler unit to the suction space, the flange portion being coupled to a driving portion to transmit driving force to the piston, wherein the bearing surface is subjected to a surface treatment to improve abrasion resistance.

The bearing portion may be coupled to the head portion and the flange portion through bonding.

An adhesive may be interposed between the bearing portion and the head portion or between the bearing portion and the flange portion.

The adhesive may include an anaerobic adhesive or an epoxy adhesive.

The bearing surface may be laminated with a surface treatment layer configured to improve the abrasion resistance.

The surface treatment layer may include one or more of diamond like carbon (DLC), Teflon (PTFE), a nickel-phosphorus alloy material, and an anodizing layer.

An outer circumferential surface of the head portion may be provided in close contact with an inner circumferential surface of the bearing portion, and the compression surface of the head portion may be disposed on the same plane as a front end surface of the bearing portion.

The suction port may be disposed to be spaced inward from the inner circumferential surface of the bearing portion.

The suction port partially may include the inner circumferential surface of the bearing portion.

The suction port may be recessed inward from the outer circumferential surface of the head portion in a radial direction.

A seating portion configured to provide a stepped portion so that the head portion is seated thereon may be disposed in a front of the inner circumferential surface of the bearing portion.

The head portion may include: an insertion portion inserted through the front opening of the bearing portion so as to be coupled to an inside of the bearing portion; and a front seating portion extending outward from the insertion portion in front of the insertion portion to supported on front end surface of the bearing portion.

In another embodiment, a piston for a compressor, the piston being configured to compress and discharge a refrigerant suctioned into a cylinder, includes: a body portion including a cylindrical portion having a cylindrical shape to define a suction space into which the suctioned refrigerant is accommodated therein; and a bearing portion having an inner diameter corresponding to an outer diameter of the body portion, configured to surround an outer circumferential surface of the cylindrical portion, and provided with a bearing surface facing an inner circumferential surface of the cylinder, wherein the bearing surface is subjected to a surface treatment to improve abrasion resistance so that only the bearing portion having the cylindrical shape is inserted into a surface treatment device.

The bearing portion may be coupled to the body portion through bonding.

An adhesive may be interposed between the bearing portion and the body portion.

The adhesive may include an anaerobic adhesive or an epoxy adhesive.

The bearing surface may be laminated with a surface treatment layer configured to improve the abrasion resistance.

The surface treatment layer may include one or more of diamond like carbon (DLC), Teflon (PTFE), a nickel-phosphorus alloy material, and an anodizing layer.

The piston may further include a head portion integrally formed with the bearing portion in front of the bearing portion and provided with a plurality of suction ports configured to communicate with the suction space, the head portion having a compression surface configured to face a compression space to compress the refrigerant in the compression space.

The piston may further include a head portion in which a plurality of suction ports integrated with each other and configured to communicate with the suction space are provided in front of the bearing portion and which is provided with a compression surface configured to compress a compression space.

DETAILED DESCRIPTION OF THE EMBODIMENTS

Hereinafter, embodiments disclosed in this disclosure is described with reference to the accompanying drawings, and the same or corresponding components are given with the same drawing number regardless of reference number, and their duplicated description will be omitted.

In description of embodiments disclosed in this specification, it will also be understood that when an element is referred to as being "connected to" or "coupled with" another element, it can be directly connected to the other element, or intervening elements may also be present.

Moreover, in description of embodiments disclosed in this specification, detailed descriptions related to well-known functions or configurations will be ruled out in order not to unnecessarily obscure subject matters of the present disclosure. However, this does not limit the present disclosure within specific embodiments and it should be understood that the present disclosure covers all the modifications, equivalents, and replacements within the idea and technical scope of the present disclosure.

The terms used in the disclosure may be replaced with terms such as document, specification, description.

Figure 1:
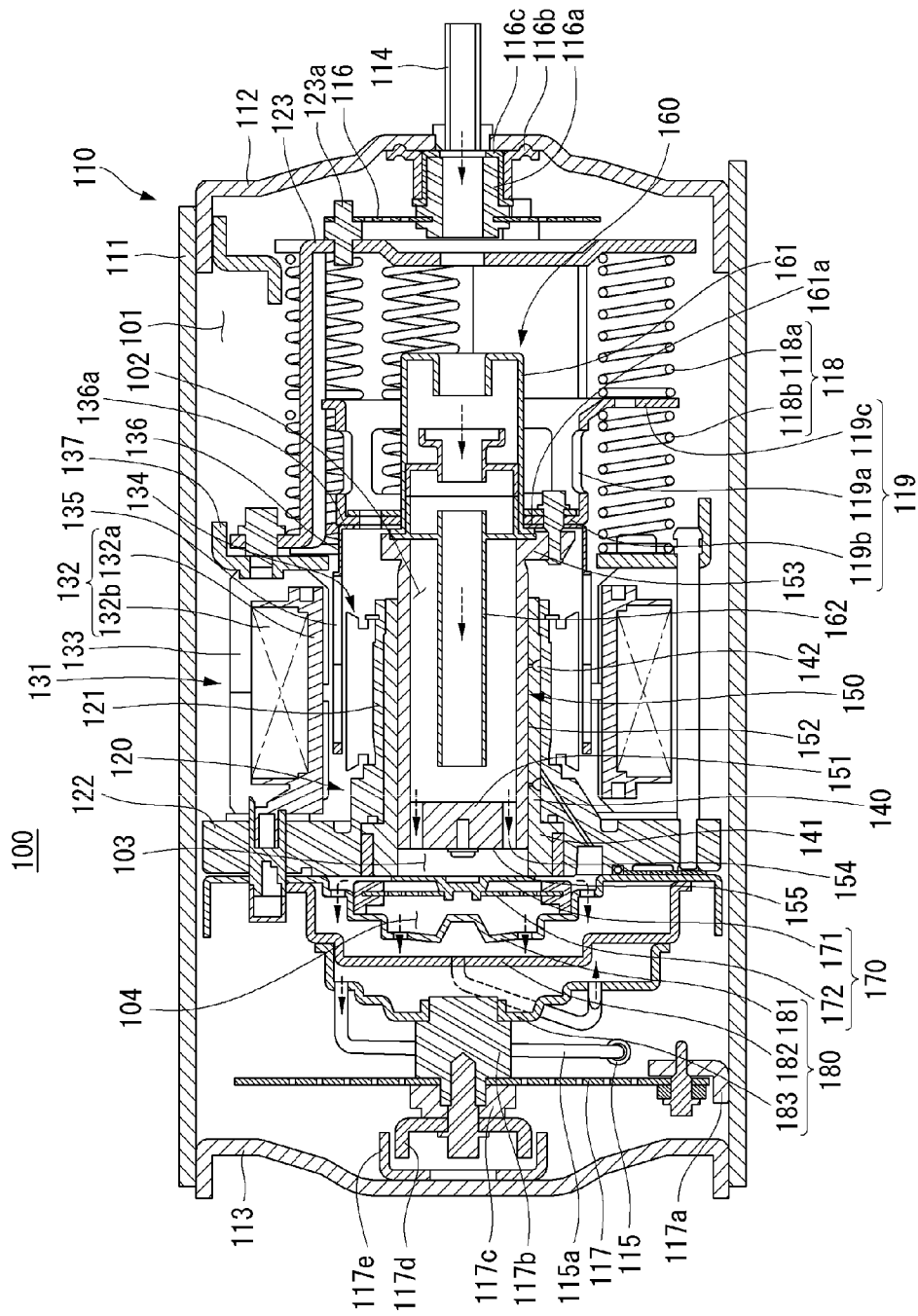
FIG. 1 is a cross-sectional view for explaining a structure of a compressor.

FIG. 1 is a cross-sectional view for explaining a structure of a compressor 100.

Hereinafter, a compressor according to an embodiment will be described with an example of a linear compressor in which a piston linearly reciprocates to suction and compress a fluid and discharge the compressed fluid.

The linear compressor may be a component of a refrigeration cycle, and the fluid compressed in the linear compressor may be a refrigerant circulating in the refrigeration cycle. In addition to the compressor, the refrigeration cycle includes a condenser, an expansion device, and an evaporator. Also, the linear compressor may be used as one component of a cooling system of a refrigerator, but is not limited thereto. For example, the linear compressor may be widely used throughout the industry.

Referring to FIG. 1, a compressor 100 includes a casing 110 and a main body accommodated in the casing 110, and the main body includes a frame 120, a cylinder 140 fixed to the frame 120, a piston 150 for linearly reciprocating inside the cylinder 140, and a driving unit 130 that is fixed to the frame 120 and provides driving force to the piston 150. Here, the cylinder 140 and the piston 150 may be referred to as compression units 140 and 150.

The compressor 100 may be provided with a bearing unit for reducing friction between the cylinder 140 and the piston 150. The bearing unit may be an oil bearing or a gas bearing. Alternatively, a mechanical bearing may be used as the bearing unit.

The main body of the compressor 100 may be elastically supported by support springs 116 and 117 installed at both inner ends of the casing 110. The support spring 116 and 117 may include a first support spring 116 supporting a rear side of the main body and a second support spring 117 supporting a front side of the main body and be provided as a plate spring. The support springs 116 and 117 may absorb vibrations and impacts generated by the reciprocating motion of the piston 150 while supporting components provided in the man body.

The casing 110 may define a sealed space, and the sealed space includes an accommodation space 101 in which the suctioned refrigerant is accommodated, a suction space 102 filled with the refrigerant before being compressed, a compression space 103 in which the refrigerant is compressed, and a discharge space 104 filled with the compressed refrigerant.

That is, the refrigerant suctioned from a suction tube 114 connected to a rear side of the casing 110 is filled in the accommodation space 101, and the refrigerant in the suction space 102 communicating with the accommodation space 101 is compressed in the compression space 103 and discharged to the discharge space 104. Then, the refrigerant is discharged to the outside through a discharge tube 115 connected to a front side of the casing 110.

The casing 110 may include a shell 111 having an elongated cylindrical shape in a substantially transverse direction with both ends opened, a first shell cover 112 coupled to a rear side of the shell 111, and a second shell cover 113 coupled to a front side of the shell 111. Here, the front side denotes a direction in which the compressed refrigerant is discharged to a left side of the drawing, and the rear side denotes a direction in which the refrigerant is introduced into a right side of the drawing. Also, the first shell cover 112 or the second shell cover 113 may be integrated with the shell 111.

The casing 110 may be made of a thermally conductive material. Thus, heat generated in the inner space of the casing 110 may be rapidly released to the outside.

The first shell cover 112 may be coupled to the shell 111 to seal the rear side of the shell 111, and a suction tube 114 may be inserted in a center of the first shell cover 112 so as to be coupled to the first shell cover 112.

A rear side of a compressor body may be elastically supported in a radial direction by the first shell cover 112 through the first support spring 116.

The first support spring 116 may be provided as a circular plate spring. The first support spring 116 may have an edge portion supported by a back cover 123 in the front direction through the support bracket 123a and an opened central portion supported by the first shell cover 112 in the rear direction through the suction guide 116a.

The suction guide 116a is provided in a cylindrical shape in which a through-passage is provided. A central opening of the first support spring 116 may be coupled to a front-side outer circumferential surface of the suction guide 116a, a rear-side end of the suction guide 116a may be supported by the first shell cover 112. Here, a separate suction-side support member 116b may be disposed between the suction guide 116a and an inner surface of the first shell cover 112.

A rear-side of the suction guide 116a may communicate with the suction tube 114. Thus, the refrigerant suctioned through the suction tube 114 may pass through the suction guide 116a and then be smoothly introduced into a muffler unit 160 to be described later.

A damping member 116c made a rubber material or the like may be installed between the suction guide 116a and the suction-side support member 116b. Thus, vibrations that may occur while the refrigerant is suctioned through the suction tube 114 may be prevented from being transmitted to the first shell cover 112.

The second shell cover 113 may be coupled to the shell 111 to seal the front side of the shell 111, and the discharge tube 115 may be inserted and coupled through a loop pipe 115a. The refrigerant discharged from the compression space 103 may pass through a discharge cover assembly 180 and then be discharged into the refrigeration cycle through the loop pipe 115a and the discharge tube 115.

The front side of the compressor body may be elastically supported in the radial direction by the shell 111 or the second shell cover 113 through the second support spring 117.

The second support spring 117 may be provided as a circular plate spring, and the opened central portion of the second support spring 117 may be supported by the discharge cover assembly 180 in a rear direction through a first support guide 117b, and the edge portion of the second support spring 117 may be supported by an inner surface of the shell 111 in the radial direction or an inner circumferential surface of the shell 11 adjacent to the second shell cover 113 through the support bracket 117a. Unlike the drawing, the edge portion of the second support spring 117 may be supported by the second shell cover 113 in the front direction through a bracket (not shown).

The first support guide 117b may have a continuous cylindrical shape having different diameters. Here, a front side of the first support guide 117b may be inserted into the central opening of the second support spring 117, and a rear side of the first support guide 117b may be inserted into the central opening of the discharge cover assembly 180. A support cover 117c may be coupled to the front side of the first support guide 117b with the second support spring 117 therebetween. Also, a cup-shaped second support guide 117d that is recessed forward may be coupled to the front side of the support cover 117c, and a cup-spaced third support guide 117e that is recessed backward to correspond to the second support guide 117d may be coupled to the inside of the second shell cover 113. The second support guide 117d may be inserted into the third support guide 117e so as to be supported in the axial direction and the radial direction. Here, a gap may be defined between the second support guide 117d and the third support guide 117e.

The frame 120 includes a body portion 121 supporting the outer circumferential surface of the cylinder 140 and a flange portion 122 connected to one side of the body portion 121 to support the driving unit 130. The frame 120 may be elastically supported together with the driving unit 130 and the cylinder 140 by the casing 110 through the first support spring 116 and the second support spring 117.

The body portion 121 may have a cylindrical shape surrounding the outer circumferential surface of the cylinder 140, and the flange portion 122 may extend from a front-side end of the body portion 121 in the radial direction.

The cylinder 140 may be coupled to an inner circumferential surface of the body portion 121, and an inner stator 134 may be coupled to an outer circumferential surface of the body portion 121. For example, the cylinder 140 may be fixed to be press-fitted to the inner circumferential surface of the body portion 121, and the inner stator 134 may be fixed using a fixing ring.

An outer stator 131 may be coupled to a rear surface of the flange portion 122, and the discharge cover assembly 180 may be coupled to a front surface of the flange portion 122. For example, the outer stator 131 and the discharge cover assembly 180 may be fixed to each other through a mechanical coupling unit.

A bearing inlet groove constituting a portion of the gas bearing may be defined in one side of the front surface of the flange portion 122, and a bearing communication hole passing from the bearing inlet groove to the inner circumferential surface of the body portion 121 may be defined. A gas groove communicating with the bearing communication hole may be defined in the inner circumferential surface of the body portion 121.

The bearing inlet groove may be recessed by a predetermined depth in the axial direction, and the bearing communication hole may be provided as a hole having a cross-sectional area less than that of the bearing inlet groove and be inclined toward the inner circumferential surface of the body portion 121. The gas groove may have an annular shape with a predetermined depth and an axial length in the inner circumferential surface of the body portion 121. Alternatively, the gas groove may be defined in the outer circumferential surface of the cylinder 140, which contacts the inner circumferential surface of the body portion 121, or may be defined in both the inner circumferential surface of the body portion 121 and the outer circumferential surface of the cylinder 140.

In addition, a gas inflow hole 142 corresponding to the gas groove of the body portion 121 may be defined in the outer circumferential surface of the cylinder 140. The gas inflow hole 142 constitutes a portion of a nozzle portion in the gas bearing.

Each of the frame 120 and the cylinder 140 may be made of aluminum or an aluminum alloy.

The cylinder 140 may have a cylindrical shape of which both ends are opened, the piston 150 may be inserted through a rear end of the cylinder 140, and a front end of the cylinder 140 may be closed through the discharge valve assembly 170. The compression space 103 surrounded by the cylinder 140, a front end (a head portion 151) of the piston 150, and the discharge valve assembly 170 may be defined. The compression space 103 may increase in volume when the piston 150 moves backward, and the compression space 103 may decrease in volume when the piston 150 moves forward. That is, the refrigerant introduced into the compression space 103 may be compressed while the piston 150 moves forward and may be discharged through the discharge valve assembly 170.

A front end of the cylinder 140 may be bent outward to provide the flange portion 141. The flange portion 141 of the cylinder 140 may be coupled to the frame 120. For example, a flange groove corresponding to the flange portion 141 of the cylinder 140 may be defined in the front-side end of the frame 120, and the flange portion 141 of the cylinder 140 may be inserted into the flange groove and be coupled through the mechanical coupling member.

A gas bearing unit for gas lubrication between the cylinder 140 and the piston 150 by supplying a discharge gas into a gap between the inner circumferential surface of the piston 150 and the outer circumferential surface of the cylinder 140 may be provided. The discharge gas between the cylinder 140 and the piston 150 may provide levitation force to the piston 150 to reduce friction of the piston 150 against the cylinder 140.

For example, the gas inflow hole 142 communicating with the gas groove defined in the inner circumferential surface of the body portion 121 to guide the compressed refrigerant, which is introduced into the gas groove by passing through the cylinder 140 in the radial direction, to the gap between the inner circumferential surface of the cylinder 140 and the outer circumferential surface of the piston 150 may be defined in the cylinder 140. Alternatively, in consideration of convenience of processing, the gas groove may be defined in the outer circumferential surface of the cylinder 140.

An inlet of the gas inflow hole 142 may be relatively wide, and an outlet of the gas inflow hole 142 may be provided as a fine hole to serve as a nozzle. A filter (not shown) may be additionally provided at the inlet of the gas inflow hole 142 to block an inflow of foreign substances. The filter may be a mesh filter made of metal or may be provided by winding a member such as a fine thread.

A plurality of gas inflow holes 142 may be independently defined. Alternatively, an inlet of the gas inflow hole 142 may be provided as an annular groove, and a plurality of outlets of the gas inflow hole 142 may be defined along the annular groove at a predetermined interval.

Also, the gas inflow hole 142 may be defined only at the front side with respect to a middle of the axial direction of the cylinder 140 or may be defined at the rear side in consideration of drooping of the piston 150.

The piston 150 is inserted into the opened end of the rear side of the cylinder 140 and is provided to seal the rear side of the compression space 103.

The piston 150 includes a head portion 151 that divides the compression space 103 in a disk shape and a cylindrical guide portion 152 extending backward from an outer circumferential surface of the head portion 151.

The head portion 151 may be provided to be partially opened, and the guide portion 152 may be provided in a hollow cylindrical shape so that a space is defined therein. That is, the suction space 102 may be defined as an inner space defined by the head portion 151 and the guide portion 152.

The front of the guide portion 152 is partially sealed by the head portion 151, but the rear of the guide portion 152 is opened to be connected to the muffler unit 160. The head portion 151 may be provided as a separate member coupled to the guide portion 152, or the head portion 151 and the guide portion 152 may be integrated with each other.

A suction port 154 is provided to pass through the head portion 151 of the piston 150. The suction port 154 is provided to communicate with the suction space 102 and the compression space 103 inside the piston 150. For example, the refrigerant introduced from the accommodation space 101 to the suction space 102 inside the piston 150 may pass through the suction port 154 to pass through the compression space 103 between the piston 150 and the cylinder 140.

The suction port 154 may extend in the axial direction of the piston 150. Alternatively, the suction port 154 may be provided to be inclined in the axial direction of the piston 150. For example, the suction port 154 may extend to be inclined in a direction away from a central axis toward the rear side of the piston 150.

The suction port 154 may have a circular opening and a constant inner diameter. Alternatively, the suction port 154 may be provided as a long hole of which an opening extends in a radial direction of the head portion 151 or may be provided so that the inner diameter gradually increases toward the rear side.

The suction port 154 may be provided in plurality in one or more directions of a radial direction and a circumferential direction of the head portion 151.

Also, a suction valve 155 for selectively opening or closing the suction port 154 may be mounted on the head portion 151 of the piston 150 adjacent to the compression space 103. The suction valve 155 may operate by elastic deformation to open or close the suction port 154. That is, the suction valve 155 may be elastically deformed to open the suction port 154 by a pressure of the refrigerant flowing through the suction port 154 to flow to the compression space 103.

Also, the piston 150 is connected to a mover 135, and the mover 135 reciprocates in a front and rear direction according to the movement of the piston 150. The inner stator 134 and the cylinder 140 may be disposed between the mover 135 and the piston 150. The mover 135 and the piston 150 may be connected to each other by a magnet frame 136 provided by bypassing the cylinder 140 and the inner stator 134 backward.

The muffler unit 160 is coupled to the rear side of the piston 150 and is provided to attenuate noise generated during the process of suctioning the refrigerant into the piston 150. The refrigerant suctioned through the suction tube 114 flows into the suction space 102 inside the piston 150 through the muffler unit 160.

The muffler unit 160 includes a suction muffler 161 communicating with the accommodation space 101 of the casing 110 and an inner guide 162 connected to a front side of the suction muffler 161 to guide the refrigerant to the suction port 154.

The suction muffler 161 may be disposed behind the piston 150. Here, a rear-side opening of the suction muffler 161 may be disposed adjacent to the suction tube 114, and a front end of the suction muffler 161 may be coupled to the rear side of the piston 150. The suction muffler 161 has a flow passage provided in the axial direction and may guide the refrigerant in the accommodation space 101 to the suction space 102 inside the piston 150.

Here, a plurality of noise spaces divided by baffles may be defined inside the suction muffler 161. The suction muffler 161 may be provided by coupling two or more members to each other. For example, a second suction muffler may be press-fitted inside a first suction muffler to define the plurality of noise spaces. Also, the suction muffler 161 may be made of a plastic material in consideration of weight or insulation.

The inner guide 162 may have a pipe shape of which one side communicates with the noise space of the suction muffler 161, and the other side is deeply inserted into the piston 150. The inner guide 162 may have a cylindrical shape of which both ends are provided with the same inner diameter. However, in some cases, an inner diameter of a front end, which is a discharge-side, may be greater than that of a rear end which is an opposite side of the front end.

The suction muffler 161 and the inner guide 162 may be provided in various shapes to control a pressure of the refrigerant passing through the muffler unit 160. Also, the suction muffler 161 and the inner guide 162 may be integrated with each other.

The discharge valve assembly 170 may include a discharge valve 171 and a valve spring 172 provided at a front side of the discharge valve 171 to elastically support the discharge valve 171. The discharge valve assembly 170 may selectively discharge the refrigerant compressed in the compression space 103. Here, the compression space 103 may be understood as a space defined between the suction valve 155 and the discharge valve 171.

The discharge valve 171 may be disposed to be supported on a front surface of the cylinder 140 and may be mounted to selectively open or close the front opening of the cylinder 140. The discharge valve 171 may operate by elastic deformation to open or close the compression space 103. The discharge valve 171 may be elastically deformed to open the compression space 103 by the pressure of the refrigerant flowing into the discharge space 104 through the compression space 103. For example, while the discharge valve 171 is supported on the front surface of the cylinder 140, the compression space 103 may be maintained in the sealed state, and the discharge valve 171 may discharge the compressed refrigerant of the compression space 103 into the opened space in a state of being spaced apart from the front surface of the cylinder 140.

The valve spring 172 is provided between the discharge valve 171 and the discharge cover assembly 180 to provide elastic force in the axial direction. The valve spring 172 may be provided as a compression coil spring or may be provided as a plate spring in consideration of an occupied space or reliability.

When a pressure in the compression space 103 is greater than or equal to the discharge pressure, the valve spring 172 is deformed forward to open the discharge valve 171, and the refrigerant is discharged from the compression space 103 and then discharged into the first discharge space 103a of the discharge cover assembly 180. Also, when the discharge of the refrigerant is completed, the valve spring 172 provides restoring force to the discharge valve 171 so that the discharge valve 171 is closed.

A process in which the refrigerant is introduced into the compression space 103 through the suction valve 155, and the refrigerant in the compression space 103 is discharged to the discharge space 104 through the discharge valve 171 will be described as follows.

In the process in which the piston 150 linearly reciprocates inside the cylinder 140, when the pressure in the compression space 103 is equal to or less than a predetermined suction pressure, the suction valve 155 is opened, and the refrigerant is suctioned into the compression space 103.

On the other hand, when the pressure in the compression space 103 exceeds the predetermined suction pressure, the refrigerant in the compression space 103 is compressed in the state in which the suction valve 155 is closed.

On the other hand, when a pressure in the compression space 103 is greater than or equal to a predetermined discharge pressure, the valve spring 172 is deformed forward to open the discharge valve 171, and the refrigerant is discharged from the compression space 103 to the discharge space 104 of the discharge cover assembly 180. When the discharge of the refrigerant is completed, the valve spring 172 provides restoring force to the discharge valve 171, and the discharge valve 171 is closed to seal the front side of the compression space 103.

The discharge cover assembly 180 is installed in front of the compression space 103 to define the discharge space 104 in which the refrigerant discharged from the compression space 103 is accommodated and then is coupled to the front side of the frame 120 to allow noise of the refrigerant, which is generated while the refrigerant is discharged from the compression space 103 to being attenuated. The discharge cover assembly 180 may be coupled to the front side of the flange portion 122 of the frame 120 while accommodating the discharge valve assembly 170. For example, the discharge cover assembly 180 may be coupled to the flange portion 122 through the mechanical coupling member.

A gasket 165 for insulation and an O-ring for suppressing leakage of the refrigerant of the discharge space 104 may be provided between the discharge cover assembly 180 and the frame 120.

The discharge cover assembly 180 may be made of a thermally conductive material. Thus, when a high-temperature refrigerant is introduced into the discharge cover assembly 180, heat of the refrigerant may be transferred to the casing 110 through the discharge cover assembly 180 and then be released to the outside of the compressor.

The discharge cover assembly 180 may be provided as one discharge cover, or a plurality of discharge covers may be disposed to sequentially communicate with each other. When the plurality of discharge covers are provided, the discharge space 104 may include a plurality of space portions partitioned by each of the discharge covers. The plurality of space portions are arranged in the front-rear direction to communicate with each other.

For example, when three discharge covers are provided, the discharge space 104 may include a first discharge space 103a defined between a first discharge cover 181 coupled to a front-side of the frame 120 and the frame 120, a second discharge space 103b defined between a second discharge cover 182 communicating with the first discharge space 103a and coupled to a front-side of the first discharge cover 181 and the first discharge cover 181, and a third discharge space 103c defined between a third discharge cover 183 communicating with the second discharge space 103b and coupled to a front-side of the second discharge cover 182 and the second discharge cover 182.

The first discharge space 103a may selectively communicate with the compression space 103 by the discharge valve 171, the second discharge space 103b may communicate with the first discharge space 103a, and the third discharge space 103c may communicate with the second discharge space 103b. Thus, the refrigerant discharged from the compression space 103 may sequentially pass through the first discharge space 103a, the second discharge space 103b, and the third discharge space 103c and thus be attenuated in discharge noise and then may be discharged to the outside of the casing 110 through the loop pipe and the discharge tube 115, which communicate with the third discharge cover 813.

The driving unit 130 includes an outer stator 131 disposed between the shell 111 and the frame 120 to surround the body portion 121 of the frame 120, an inner stator 134 disposed between the outer stator 131 and the cylinder 140 to surround the cylinder 140, and a mover 135 disposed between the outer stator 131 and the inner stator 134.

The outer stator 131 may be coupled to the rear side of the flange portion 122 of the frame 120, and the inner stator 134 may be coupled to the outer circumferential surface of the body portion 121 of the frame 120. The inner stator 134 may be spaced inward from the outer stator 131, and the mover 135 may be disposed in a space between the outer stator 131 and the inner stator 134.

A winding coil may be mounted on the outer stator 131, and the mover 135 may be provided with a permanent magnet. The permanent magnet may be provided as a single magnet having one pole or may be provided as a combination of a plurality of magnets having three poles.

The outer stator 131 includes a coil winding body 132 surrounding the axial direction in the circumferential direction and a stator core 133 stacked while surrounding the coil winding body 132. The coil winding body 132 may include a hollow bobbin 132a having a cylindrical shape and a coil 132b wound in the circumferential direction of the bobbin 132a. A cross-section of the coil 132b may have a circular or polygonal shape, and for example, may have a hexagonal shape. In the stator core 133, a plurality of lamination sheets may be radially stacked, or a plurality of lamination blocks may be stacked along a circumferential direction.

A front-side of the outer stator 131 may be supported by the flange portion 122 of the frame 120, and a rear-side of the outer stator 131 may be supported by the stator cover 137. For example, the stator cover 137 may be provided in the form of a hollow disk, the outer stator 131 may be supported on a front surface of the stator cover 137, and a resonance spring 190 may be supported on a rear surface of the stator cover 137.

The inner stator 134 may be configured by stacking a plurality of laminations on the outer circumferential surface of the body portion 121 of the frame 120 in the circumferential direction.

One side of the mover 135 may be coupled to and supported by the magnet frame 136. The magnet frame 136 has a substantially cylindrical shape and is disposed to be inserted into a space between the outer stator 131 and the inner stator 134. The magnet frame 136 is coupled to the rear side of the piston 150 and is provided to move together with the piston 150.

For example, a rear end of the magnet frame 136 may be bent to extend inward in the radial direction to provide a coupling portion 136a, and the coupling portion 136a may be coupled to the flange portion 153 disposed behind the piston 150. The coupling portion 136a of the magnet frame 136 and the flange portion 153 of the piston 150 may be coupled to each other through the mechanical coupling member.

Furthermore, the flange portion 161a disposed in front of the suction muffler 161 may be disposed between the flange portion 153 of the piston 150 and the coupling portion 136a of the magnet frame 136. Thus, the piston 150, the muffler unit 160, and the mover 135 may linearly reciprocate together in a state of being integrally coupled to each other.

When current is applied to the driving unit 130, a magnetic flux is generated in the winding coil, and electromagnetic force may be generated by an interaction between the magnetic flux generated in the winding coil of the outer stator 131 and the magnetic flux generated by a permanent magnet of the mover 135 may be generated to allow the mover 135 to move. Also, while the axial reciprocation movement of the mover 135 is performed, the piston 150 connected to the magnet frame 136 may also reciprocate in the axial direction by being integrated with the mover 135.

The driving unit 130 and the compression units 140 and 150 may be supported in the axial direction by the support springs 116 and 117 and the resonance spring 190.

The resonance spring 118 may amplify the vibration implemented by the reciprocating motion of the mover 135 and the piston 150 to effectively compress the refrigerant. Particularly, the resonance spring 118 may be adjusted to a frequency corresponding to the natural frequency of the piston 150 so that the piston 150 performs a resonance motion. Also, the resonance spring 118 may cause a stable movement of the piston 150 to reduce the vibration and the noise generation.

The resonance spring 118 may be a coil spring extending in the axial direction. Both ends of the resonance spring 118 may be connected to a vibration body and a fixed body, respectively. For example, one end of the resonance spring 118 may be connected to the magnet frame 136, and the other end of the resonance spring 118 may be connected to the back cover 123. Thus, the resonance spring 118 may be elastically deformed between the vibration body vibrating at one end thereof and the fixed body fixed to the other end thereof.

The natural frequency of the resonance spring 118 is designed to match the resonance frequency of the mover 135 and the piston 150 when the compressor 100 operate so that the reciprocating motion of the piston 150 is amplified. However, since the back cover 123 provided as the fixed body is elastically supported to the casing 110 through the first support spring 116, the back cover 123 may not be strictly fixed.

The resonance spring 118 may include a first resonance spring 118a supported on a rear-side thereof and a second resonance spring 118b supported on a front side thereof with respect to the spring support 119.

The spring support 119 includes a body portion 119a surrounding the suction muffler 161, a coupling portion 119b bent from a front side of the body portion 119a in an inner radial direction, and a support portion 119c bent from a rear side of the body portion 119a in an outer radial direction.

A front surface of the coupling portion 119b of the spring support 119 may be supported by the coupling portion 136a of the magnet frame 136. An inner diameter of the coupling portion 119b of the spring support 119 may be provided to surround an outer diameter of the suction muffler 161. For example, the coupling portion 119b of the spring support 119, the coupling portion 136a of the magnet frame 136, and the flange portion 153 of the piston 150 may be sequentially disposed and then integrated with each other through the mechanical member. Here, as described above, the flange portion 161a of the suction muffler 161 may be disposed between the flange portion 153 of the piston 150 and the coupling portion 136a of the magnet frame 136 and thus may be fixed together.

The first resonance spring 118a may be provided between a front surface of the back cover 123 and a rear surface of the spring support 119, and the second resonance spring 118b may be provided between a rear surface of the stator cover 137 and a front surface of the spring support 119.

A plurality of first and second resonance springs 118a and 118b may be disposed in a circumferential direction of a central axis. The first resonance spring 118a and the second resonance spring 118b may be disposed parallel to each other in the axial direction or may be disposed to be alternated with respect to each other. The first and second springs 118a and 118b may be disposed at regular intervals in the radial direction of the central axis. For example, each of the first and second springs 118a and 118b may be provided in three and may be disposed at intervals of about 120 degrees in a radial direction of the central axis.

The compressor 100 may include a plurality of sealing members that are capable of increasing in coupling force between the frame 120 and components around the frame 120.

For example, the plurality of sealing members may include a first sealing member disposed into a portion at which the frame 120 and the discharge cover assembly 180 are coupled to each other and inserted into an installation groove defined in a front end of the frame 120 and a second sealing member provided at a portion at which the frame 120 and the cylinder 140 are coupled to each other and inserted into an installation groove defined in an outer surface of the cylinder 140. The second sealing member may prevent the refrigerant in the gas groove 125c defined between the inner circumferential surface of the frame 120 and the outer circumferential surface of the cylinder 140 from leaking to the outside and improve the coupling force between the frame 120 and the cylinder 140. The plurality of sealing members may further include a third sealing member provided at a portion at which the frame 120 and the inner stator 134 are coupled to each other and inserted into an installation groove defined in an outer surface of the frame 120. Here, each of the first to third sealing members may have a ring shape.

The operation of the linear compressor 100 described above is as follows.

First, when current is applied to the driving unit 130, a magnetic flux may be generated in the outer stator 131 by the current flowing through the coil 132b. The magnetic flux generated in the outer stator 131 may generate electromagnetic force, and the mover 135 provided with the permanent magnet may linearly reciprocate by the generated electromagnetic force. The electromagnetic force may be alternately generated in a direction (forward direction) in which the piston moves toward a top dead center (TDC) during a compression stroke and may be generated in a direction (backward direction) in which the piston moves toward a bottom dead center (BDC) during a suction stroke. That is, the driving unit 130 may generate propulsion force, which is force that pushes the mover 135 and the piston 150 in the moving direction.

The piston 150 linearly reciprocating inside the cylinder 140 may repeatedly increase and decrease in volume of the compression space 103.

When the piston 150 moves in a direction (backward direction) in which the volume of the compression space 103 increases, the pressure in the compression space 103 decreases. Here, the suction valve 155 mounted at the front side of the piston 150 may be opened, and the refrigerant remaining in the suction space 102 may be suctioned into the compression space 103 along the suction port 154. The suction stroke may proceed until the piston 150 maximizes the volume of the compression space 103 and is disposed at the bottom dead center.

The piston 150 reaching the bottom dead center may be converted in moving direction to perform the compression stroke while moving in the direction (forward direction) in which the volume of the compression space 103 decreases. During the compression stroke, the suctioned refrigerant is compressed while the pressure in the compression space 103 increases. When the pressure in the compression space 103 reaches a set pressure, the discharge valve 171 is pushed by the pressure in the compression space 103 and then is opened from the cylinder 140, and the refrigerant is discharged through the spaced space. The compression stroke continues while the piston 150 moves to the top dead center at which the volume of the compression space 103 is minimized.

As the suction stroke and the compression stroke of the piston 150 are repeated, the refrigerant introduced into the accommodation space 101 inside the compressor 100 through the suction tube 114 sequentially passes through the suction guide 116a, the suction muffler 161, and the inner guide 162 and is introduced into the suction space 102, and the refrigerant of the suction space 102 is introduced into the compression space 103 inside the cylinder during the suction stroke of the piston 150. After the refrigerant in the compression space 103 is compressed and discharged to the discharge space 104 during the compression stroke of the piston 150, the refrigerant may pass through the loop pipe 115a and the discharge tube 115 to flow to the outside of the compressor 100.

Figure 2:
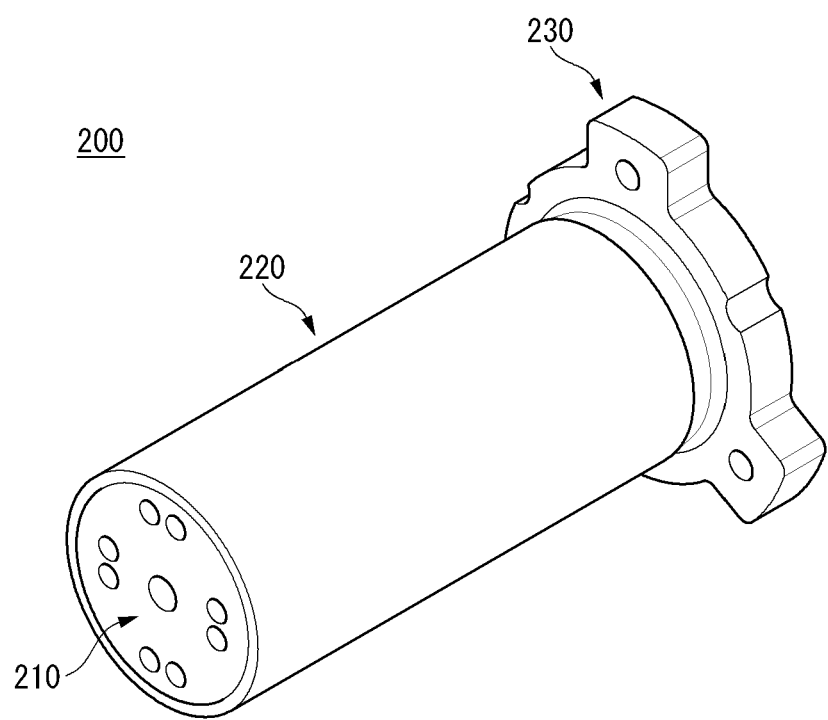
FIG. 2 is a perspective view of a compressor according to a first embodiment.
Figure 3:
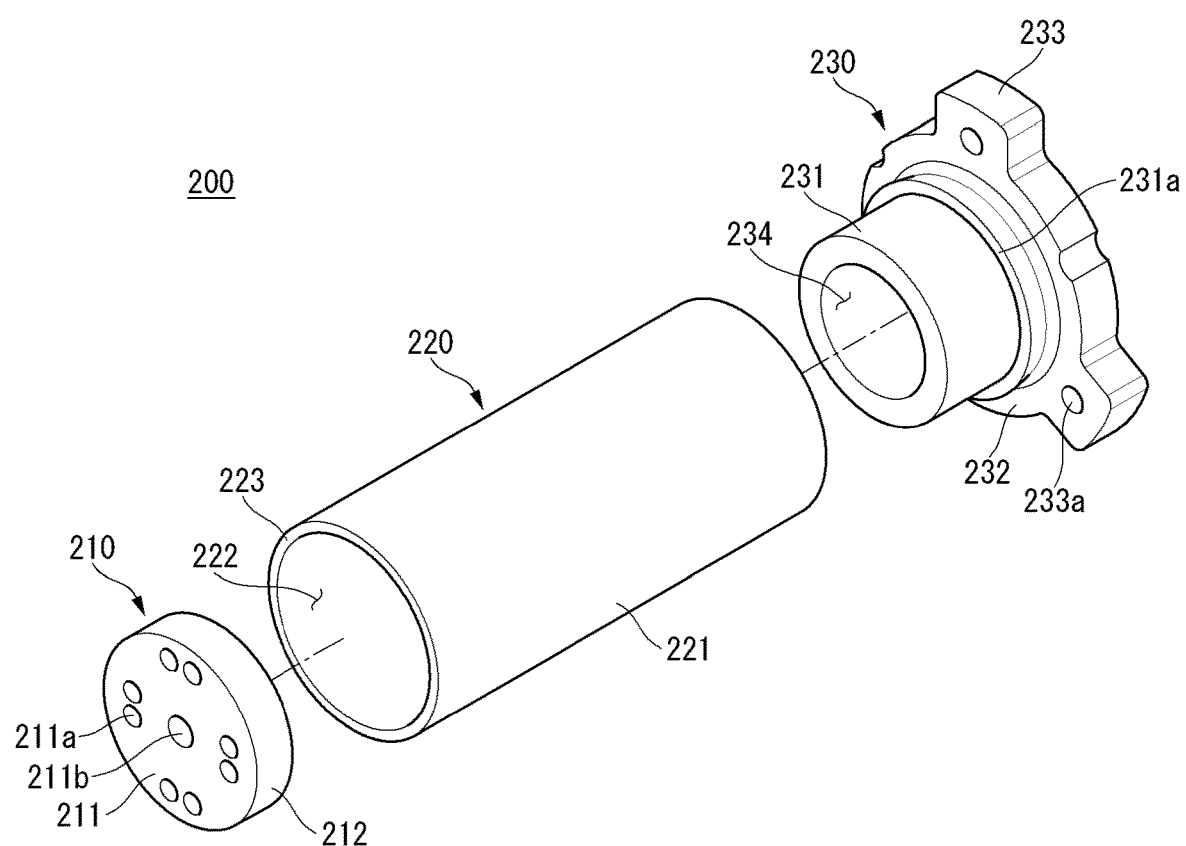
FIG. 3 is an exploded perspective view of FIG. 2.

FIG. 2 is a perspective view of a compressor according to a first embodiment. FIG. 3 is an exploded perspective view of FIG. 2, and FIG. 4 is a cross-sectional view of FIG. 2.

Figure 4:
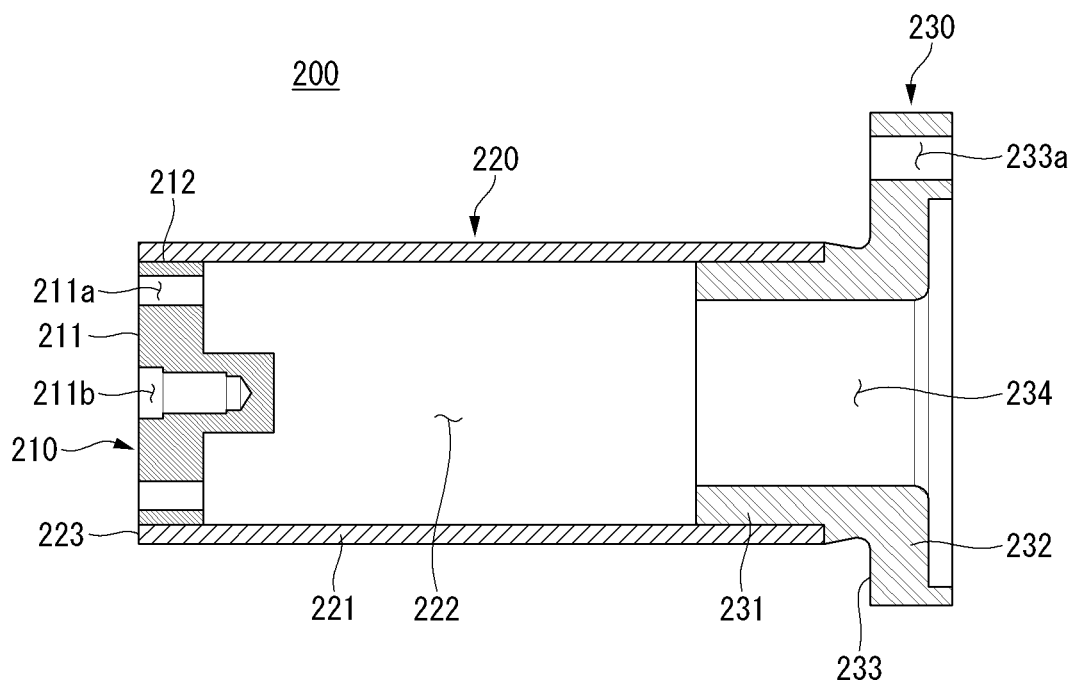
FIG. 4 is a cross-sectional view of FIG. 2.

Referring to FIGS. 2 to 4, a compressor according to a first embodiment includes a piston 200 that is slid within the cylinder (see reference numeral 140 of FIG. 1).

The piston 200 includes a bearing portion 220 that is slid within the cylinder 140, a head portion 210 coupled to the front of the bearing portion 220, and a flange portion 230 coupled to the rear of the bearing portion 220. The piston 200 may further includes a suction valve (see reference numeral 155 of FIG. 1) that opens and closes a suction port provided in the head portion 210 and a coupling member (not shown) that fixes the suction valve 155 to the head portion 210.

The bearing portion 220 may be provided in a cylindrical shape with opened front and rear sides. In the piston 200, the head portion 210 may be coupled to the front of the bearing portion 220, and the flange portion 230 may be coupled to the rear of the bearing portion 220.

The head portion 210 may have an outer diameter corresponding to an inner diameter of the bearing portion 220. For example, the outer diameter of the head portion 210 may have the same as the inner diameter of the bearing portion 220.

The head portion 210 may be inserted through the front opening of the bearing portion 220 and coupled to the inside of the bearing portion 220.

The head portion 210 and the bearing portion 220 may be coupled to each other through a boding process, for example, may be bonded to each other by using an anaerobic adhesive or an adhesive such as epoxy. Since the bonding process rather than a press-fitting process is performed, the bearing portion 220 may be prevented from being deformed by stress generated during the press-fitting. Also, the refrigerant may be prevented from leaking through a gap generated between two metal materials during the press-fitting.

A forward protruding portion of the flange portion 230 may have an outer diameter corresponding to the inner diameter of the bearing portion 220 so as to be inserted through the rear opening of the beating portion 220. The flange portion 230 and the head portion 210 may be coupled to each other through a boding process, for example, may be bonded to each other by using an anaerobic adhesive or an adhesive such as epoxy. Since the bonding process rather than a press-fitting process is performed, the bearing portion 220 may be prevented from being deformed by stress generated during the press-fitting. Also, the refrigerant may be prevented from leaking through a gap generated between two metal materials during the press-fitting.

The bearing portion 220 may extend in an axial direction to correspond to a shape of an inner wall of the cylinder 140 and also have a hollow cylindrical shape and a constant thickness in a circumferential direction. An inner space 222 of the bearing portion may define a suction space (see reference numeral 102 of FIG. 1) into which the refrigerant accommodated in an accommodation space (see reference numeral 101 of FIG. 1) is introduced.

An outer circumferential surface of the bearing portion 220 may be provided as a bearing surface 221. That is, a bearing gas provided in the cylinder 140 may be filled between the bearing surface 221 and the inner circumferential surface of the cylinder 140 to lift the piston 200, thereby preventing the piston 200 and the cylinder 140 from being in contact with each other.

Nevertheless, the bearing surface 221 may cause friction or impact with the inner wall of the cylinder 140 due to external force or an alignment error. Therefore, to prevent this limitations, surface treatment may be performed on the bearing surface 221. Abrasion resistance, lubricity, or heat resistance may be improved through the surface treatment.

The surface treatment of the bearing portion 220 may use one or more of diamond like carbon (DLC), Teflon (PTFE), a nickel-phosphorus alloy material, and an anodizing layer.

The DLC may include a thin film-shaped material that is formed by electrically accelerating carbon ions or activated hydrocarbon molecules of plasma to impact the material onto a surface of an object, as a noncrystalline carbon-based new material.

The DLC may have a physical property similar to that of diamond. Also, the DLC may have high hardness and abrasion resistance and low friction coefficient. As a result, the DLC may have superior lubricity.

For another example, the PTFE may be sprayed onto the object in a fluoride resin is formed as a paint form to perform heating and plasticizing process on the applied fluoride resin at a predetermined temperature, thereby forming an inactive coating layer. Since the PTFE has low frictional coefficient, the PTFE may improve lubricity and abrasion resistance of the surface.

For another example, a nickel (Ni)-phosphorus (P) alloy material may be provided on the outer circumferential surface of the piston 200 or the inner circumferential surface of the cylinder 140 through an electroless nickel plating manner. Here, nickel and phosphorus components may be surface-extracted to a uniform thickness. The nickel-phosphorus alloy material may have a chemical composition ratio of about 90% to about 92% of nickel (Ni) and about 9% to about 10% of phosphorus (P). The Ni—P alloy material be improved in corrosion resistance and abrasion resistance and have superior lubricity.

For further another embodiment, an anodizing technology has a kind of aluminum costing technologies and a feature in which an aluminum surface is oxidized by oxygen generated from a positive electrode when electricity is applied to aluminum serving as the positive electrode to form an oxidized aluminum film and also has superior corrosion resistance and insulation resistance.

The flange portion 230 include an insertion portion 231 inserted through the rear opening of the bearing portion 220 and coupled to the inside of the bearing portion 220 and an expansion portion 232 expanded from the rear of the bearing portion 220 in a radial direction. The expansion portion 232 may extend radially outward from a rear end of the insertion portion 231.

The flange portion 230 includes a through-passage 234 communicating with the inner space 222 of the bearing portion 220 so that the refrigerant provided into the muffler unit (see reference numeral 160 of FIG. 1) disposed at the rear side is transferred to the inner space 222 of the bearing portion 220. For example, the inner guide (see reference numeral 162 in FIG. 1) of the muffler unit 160 may be disposed to pass through the through-passage 234, and the refrigerant may be introduced into the suction space 102 of the inner space (i.e., inside) 222 of the bearing portion 220 through the inner guide 162.

The insertion portion 231 has an outer diameter corresponding to the inner diameter of the bearing portion 220 and is inserted through the rear opening of the bearing portion 220 so as to be coupled to the inner side of the bearing portion 220.

The expansion portion 232 is connected to the rear of the insertion portion 231 and is provided in a flange shape extending outward in the radial direction. In a state in which the piston 200 is coupled to the cylinder 140, the expansion portion 232 may be disposed behind the cylinder 140.

The expansion portion 232 is provided with at least one coupling portion 233 coupled to a magnet frame (see reference numeral 136 in FIG. 1) or a spring support (see reference numeral 119 in FIG. 1). The coupling portion 233 may be provided in plurality. The plurality of coupling portions 233 may protrude outward in the radial direction of the flange portion 230 and disposed at regular intervals in a circumferential direction. For example, three coupling portions 233 may be disposed on the flange portion 230 at an interval of about 120 degrees.

The coupling portion 233 has a coupling hole 233a that is integrally coupled to the magnet frame 136 disposed behind the flange portion 230. The magnet frame 136 may also have a coupling hole corresponding to the coupling hole 233a of the flange portion 230. The flange portion 230 and the magnet frame 136 may be integrally coupled to each other by allowing a pin or a screw to pass through the coupling hole.

The head portion 210 may be disposed in a front of the inside of the bearing portion 220 to partially seal the front opening of the bearing portion 220. Here, the meaning of partially sealing the front opening may be understood to mean sealing of a portion except for the suction port 211a.

The head portion 210 may be provided in a generally cylindrical shape extending in the axial direction, and the outer diameter of the head portion 210 may be provided to correspond to the inner diameter of the bearing portion 220. The outer peripheral surface 212 of the head portion 210 may be in close contact with and bonded to the inner circumferential surface of the bearing portion 220.

When the head portion 210 is press-fitted into the bearing portion 220, additional processing for forming a stepped portion on the inner circumferential surface of the bearing portion 220 may be required, and when an accuracy of the stepped portion is low, leakage may occur through the suction valve 155. In more detail, the front end of the head portion 210 may not have the same plane as the front end of the head portion 210 due to an error in stepped portion formed on the inner circumferential surface of the bearing portion 220. As a result, in the state in which the suction valve 155 is closed, leakage may occur through the gap of the front end of the piston 200. Also, the suction valve 155 may repeatedly bumped to the stepped portion of the front end and thus be deteriorated in durability.

To prevent this limitation, the head portion 210 may be mounted on the bearing portion 220 through a fixing method using an adhesive. When the head portion 210 is fixed using the adhesive, there is no need to process a separate stepped portion on the inner circumferential surface of the bearing portion 220, and the head portion 210 moves according to the use so that it is very unlikely that the front end of the piston 200 is dislocated on a single plane. For this reason, reliability and durability of the suction valve 155 may be improved.

A coupling hole 211*b* to which a coupling member for coupling the suction valve 155 may be defined in a center of the head portion 210.

In the state in which the head portion 210 is coupled to the bearing portion 220, a compression surface 211 of the head portion 210 and a front end surface 223 of the bearing portion 220 may define the same plane.

The compression surface 211 of the head portion 210 may be understood as a front end surface or a front end of the head portion 210 facing the compression space 103.

Figure 5:
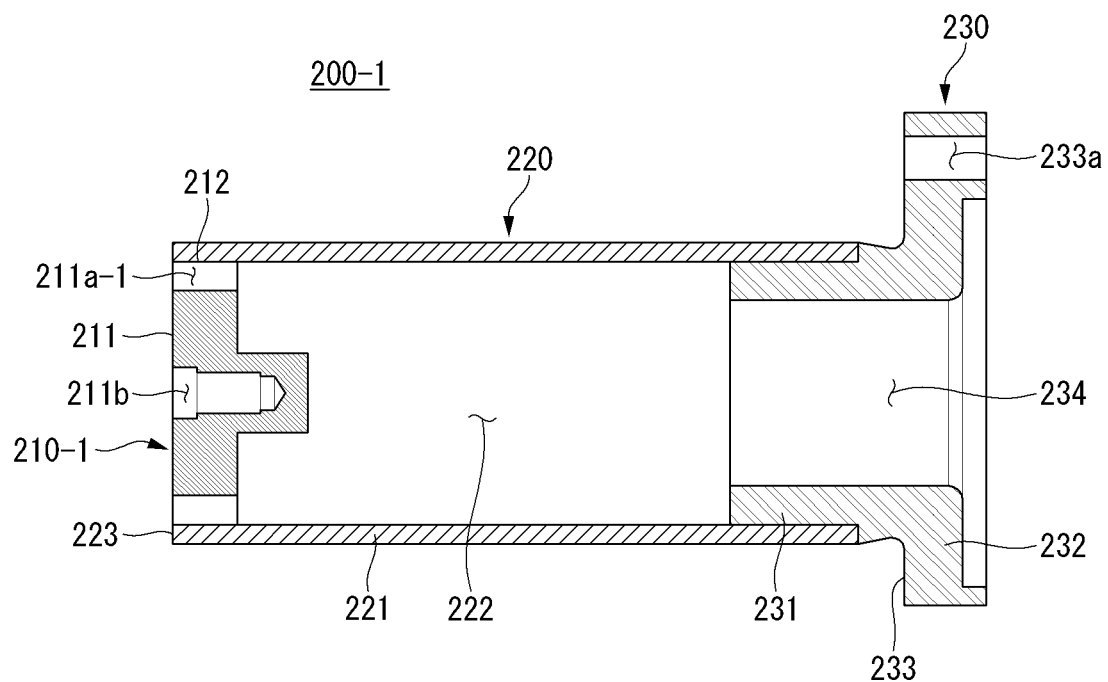
FIG. 5 is a cross-sectional view illustrating a first modified example of FIG. 4.

FIG. 5 is a cross-sectional view illustrating a first modified example of FIG. 4.

Referring to FIG. 5, in a piston 200-1 according to the first modified embodiment, a portion of a suction port 211*a*-1 provided in a head portion 210 may be provided to be opened to an outer peripheral surface 212 of the head portion 210. In a state in which the suction port 211*a*-1 is coupled to a bearing portion 220, an inner circumferential surface of the bearing portion 220 may serve as a portion of a passage through which a refrigerant flows.

That is, the suction port 211*a*-1 may be provided in a groove shape that is recessed inward from the outer peripheral surface 212 of the head portion 210.

Figure 6:
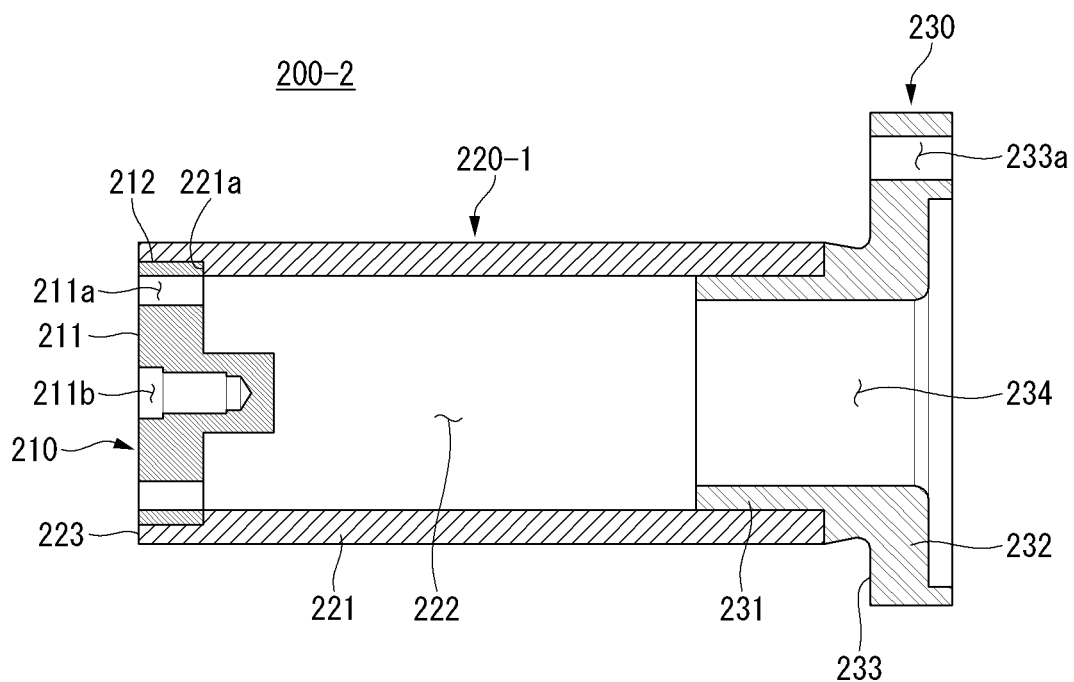
FIG. 6 is a cross-sectional view illustrating a second modified example of FIG. 4.

FIG. 6 is a cross-sectional view illustrating a second modified example of FIG. 4.

Referring to FIG. 6, in a piston 200-2 according to the second modified embodiment, a seating portion 221*a* on which a head portion 210 is seated may be provided in a front of an inner circumferential surface of a bearing portion 220. For example, the seating portion 221*a* may be defined as a stepped portion provided on the inner circumferential surface of the bearing portion 220.

The bearing portion 220 except for the seating portion 221*a* may have an inner diameter less than an outer diameter of the head portion 210, and the seating portion 221*a* may have an inner diameter corresponding to the outer diameter of the head portion 210.

In the state in which the head portion 210 is seated on the seating portion 221*a* of the bearing portion 220, a compression surface 211 of the head portion 210 and a front end surface 223 of the bearing portion 220 may define the same plane.

Figure 7:
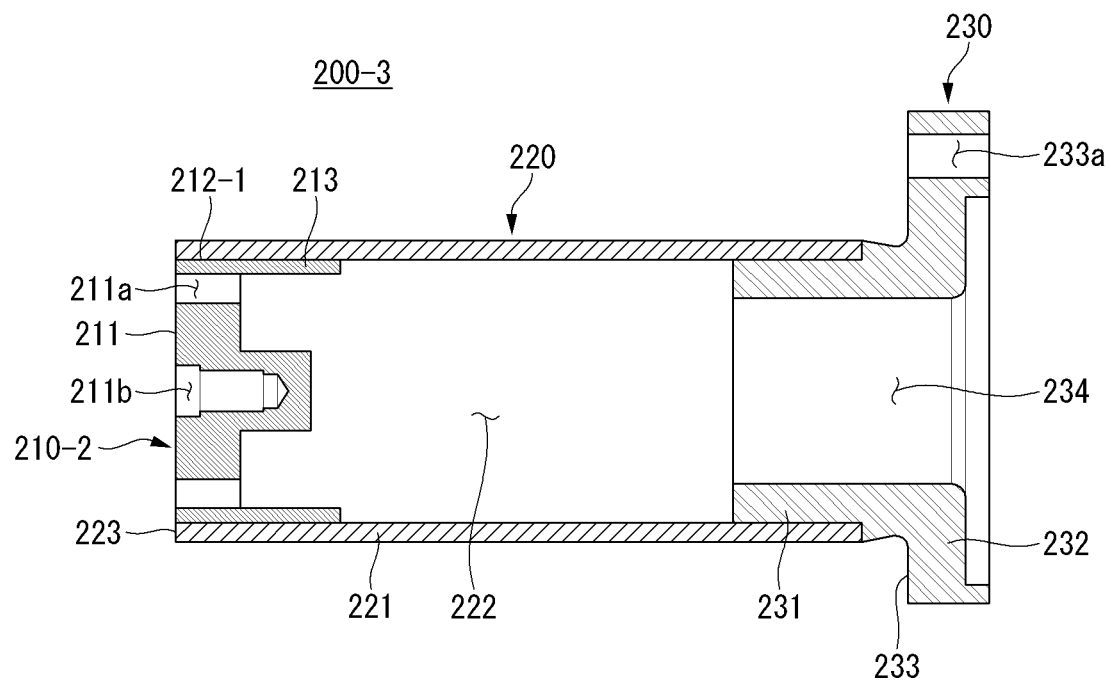
FIG. 7 is a cross-sectional view illustrating a third modified example of FIG. 4.

FIG. 7 is a cross-sectional view illustrating a third modified example of FIG. 4.

Referring to FIG. 7, in a piston 200-3 according to the third modified embodiment, a head portion 210-2 may include a bonding extension portion 213 from which a peripheral portion disposed outside a suction port 211*a* rather than a central portion thereof extends backward. The bonding extension portion 213 may increase in area of an outer circumferential surface 212-1 bonded to a bearing portion 220 when the head portion 210-2 is coupled.

The bonding extension portion 213 may have an axial length that is greater than that of a central portion of the head portion 210-1 in which the suction port 211*a* is provided. However, to reduce a weight of the head portion 210-2 and widen a suction space 102, a central portion of the head portion 210-2 is provided to a small length in the axial direction, and a thickness of the bonding extension portion 213 is also provided to be thin.

Figure 8:
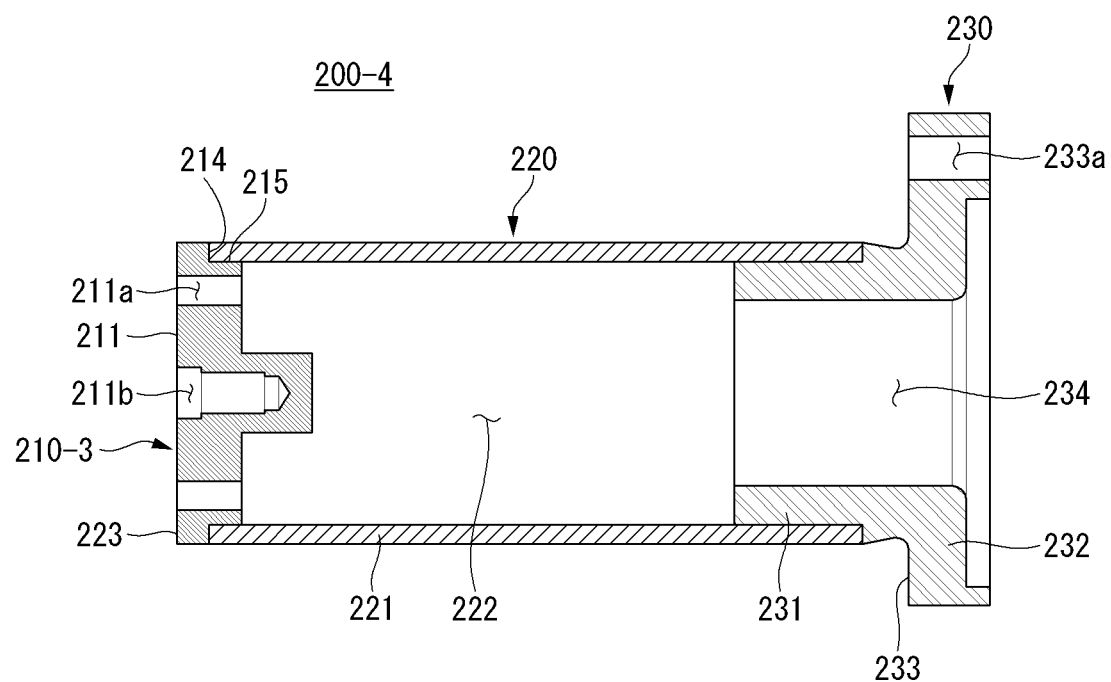
FIG. 8 is a cross-sectional view illustrating a fourth modified example of FIG. 4.

FIG. 8 is a cross-sectional view illustrating a fourth modified example of FIG. 4.

Referring to FIG. 8, in a piston 200-4 according to a fourth modified embodiment, a stepped portion may be provided on an outer circumferential surface of a head portion 210-3 so that a front end surface 223 of a bearing portion 220 is seated.

In detail, the head portion 210-3 includes an insertion portion 215 inserted through a front opening of the bearing portion 220 and coupled to the inside of the bearing portion 220 and a front seating portion 214 on which the front end surface 223 of the bearing portion 220 is seated.

The front seating portion 214 may be connected to the insertion portion 215 in front of the insertion portion 215 and may extend radially outward from the insertion portion 215.

The insertion portion 215 may have an outer diameter corresponding to an inner diameter of the bearing portion 220, and the front seating portion 214 may have the same outer diameter as the outer diameter of the bearing portion 220. That is, an outer surface of the front seating portion 214 and an outer surface of the bearing portion 220 may define the same surface.

The front seating portion 214 may be provided outside a suction port 211*a* and may be provided in the form of a flange extending outward in the radial direction of the insertion portion 215. The front seating portion 214 may be seated on the front end surface 223 of the bearing portion 220.

Figure 9:
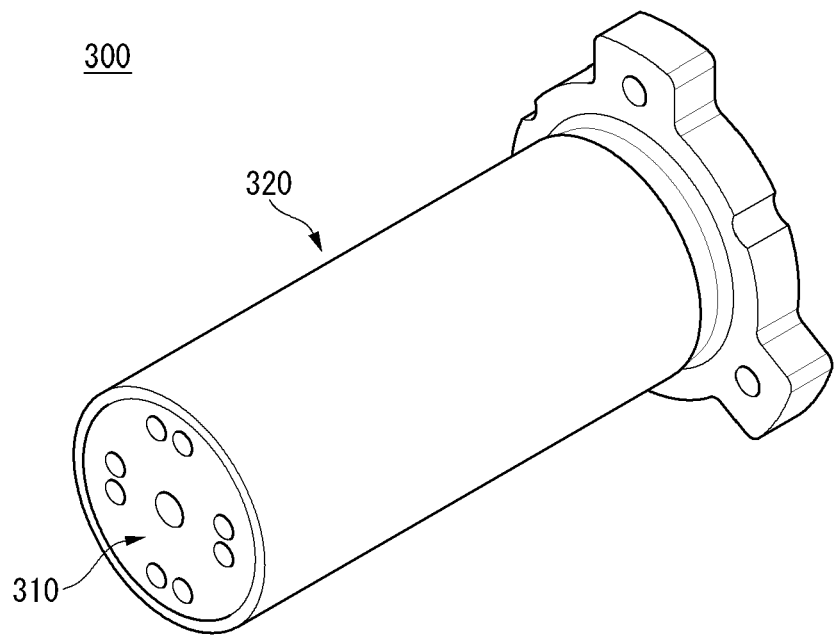
FIG. 9 is a perspective view of a compressor according to a second embodiment.
Figure 10:
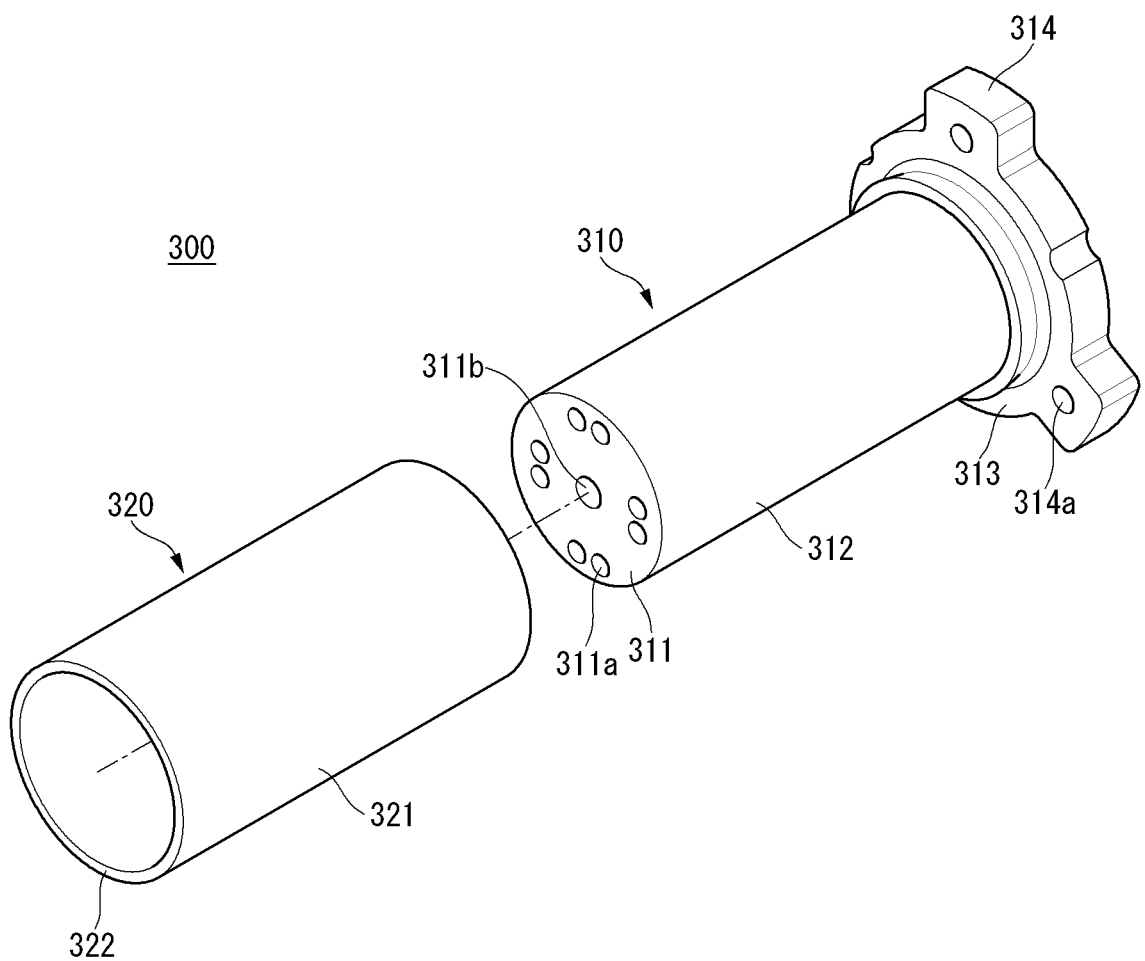
FIG. 10 is an exploded perspective view of FIG. 9.

FIG. 9 is a perspective view of a compressor according to a second embodiment. FIG. 10 is an exploded perspective view of FIG. 9, and FIG. 11 is a cross-sectional view of FIG. 9.

Figure 11:
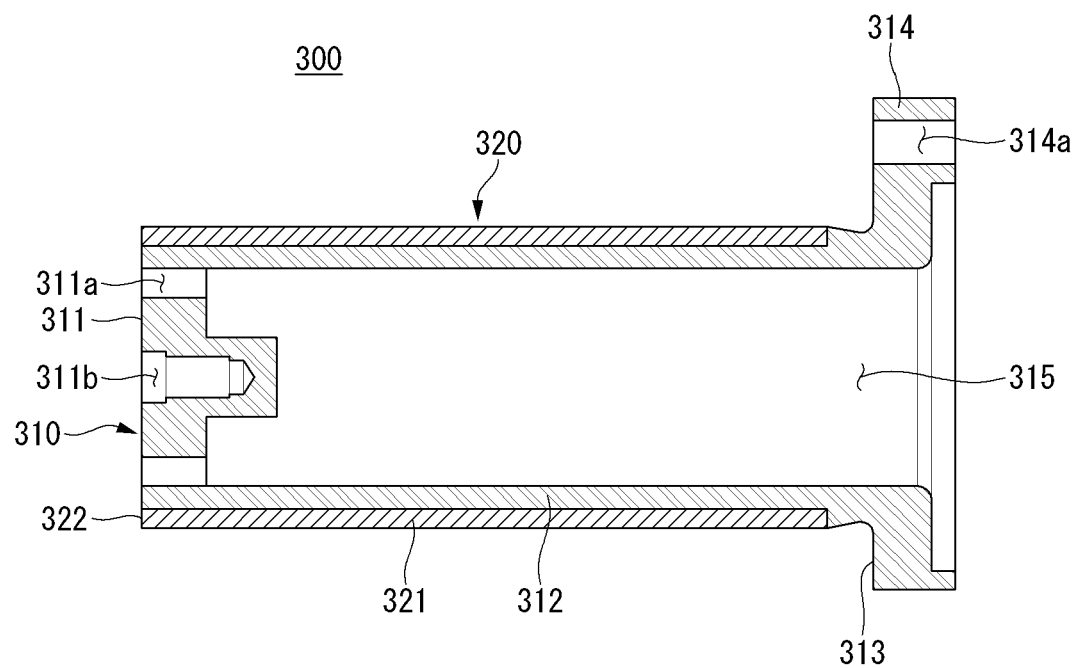
FIG. 11 is a cross-sectional view of FIG. 9.

Referring to FIGS. 9 to 11, in a compressor according to a second embodiment, a piston 300 includes a body portion 310 that is slid within a cylinder 140 and a bearing portion 320 provided to surround a cylindrical portion 312 of the body portion 310 and facing an inner circumferential surface of the cylinder 140.

The body portion 310 may include a cylindrical portion 312 provided in a cylindrical shape defining a suction space 102 therein and having a compression surface 311, in which a suction port 311*a* is provided, and a flange portion 313 disposed behind the cylindrical portion 312.

The piston 300 may further includes a suction valve (see reference numeral 155 of FIG. 1) that opens and closes a suction port 311*a* provided in the compression surface 311 and a coupling member (not shown) that fixes the suction valve 155 to the compression surface 311.

A coupling hole 311*b* to which a coupling member for coupling the suction valve 155 may be defined in a center of the compression surface 311.

The bearing portion 320 may extend lengthily in an axial direction to correspond to a shape of an inner wall of the cylinder 140 and also have a hollow cylindrical shape and a constant thickness in a circumferential direction. The bearing portion 320 is provided in a hollow cylindrical shape surrounding the cylindrical portion 312 of the body portion 310.

An outer circumferential surface of the bearing portion 320 may be provided as a bearing surface 321. That is, a bearing gas provided in the cylinder 140 may be filled between the bearing surface 321 and the inner circumferential surface of the cylinder 140 to lift the piston 300, thereby preventing the piston 300 and the cylinder 140 from being in contact with each other.

Nevertheless, the bearing surface 321 may cause friction or impact with the inner wall of the cylinder 140 due to external force or an alignment error. Therefore, to prevent this limitations, surface treatment may be performed on the bearing surface 321. Abrasion resistance, lubricity, or heat resistance may be improved through the surface treatment.

The surface treatment of the bearing portion 320 may use one or more of diamond like carbon (DLC), Teflon (PTFE), a nickel-phosphorus alloy material, and an anodizing layer.

The bearing portion 320 and the body portion 310 may be coupled to each other through a boding process, for example, may be bonded to each other by using an anaerobic adhesive or an adhesive such as epoxy. Since the bonding process rather than a press-fitting process is performed, the bearing portion 320 may be prevented from being deformed by stress generated during the press-fitting. Also, the refrigerant may be prevented from leaking through a gap generated between two metal materials during the press-fitting.

The flange portion 313 is provided to transfer a refrigerant provided from a muffler unit (see 160 in FIG. 1) disposed at a rear side to an inner space of the body portion 310. For example, an inner guide (see reference numeral 162 in FIG. 1) of the muffler unit 160 may be accommodated in the body portion 310, and the refrigerant may be introduced into the suction space 102 of the bearing portion 220 through the inner guide 162.

The flange portion 313 is connected to the rear of the cylindrical portion 312 of the body portion 310 and is provided in the form of a flange extending outward in the radial direction. In a state in which the piston 300 is coupled to the cylinder 140, the flange portion 313 may be disposed behind the cylinder 140.

The flange portion 313 is provided with at least one coupling portion 233 coupled to a magnet frame (see reference numeral 136 in FIG. 1) or a spring support (see reference numeral 119 in FIG. 1). The coupling portion 314 may be provided in plurality. The plurality of coupling portions 233 may protrude outward in the radial direction of the flange portion 230 and disposed at regular intervals in a circumferential direction. For example, three coupling portions 314 may be disposed on the flange portion 313 at an interval of about 120 degrees.

The coupling portion 314 forms a coupling hole 314a for integrally fastening with the magnet frame 136 disposed at the rear of the flange portion 313. The magnet frame 136 may also have a coupling hole corresponding to the coupling hole 314a of the flange portion 313. The flange portion 313 and the magnet frame 136 may be integrally coupled to each other by allowing a pin or a screw to pass through the coupling hole.

An inner circumferential surface of the bearing portion 320 may be in close contact with and bonded to an outer circumferential surface of the cylindrical portion 312 of the body portion 310. The bearing portion 320 may be mounted on the body portion 310 in a manner using an adhesive.

In the state in which the bearing portion 320 is bonded to the body portion 310, the compression surface 311 of the body portion 310 and the front end surface 322 of the bearing portion 320 may define the same plane.

Figure 12:
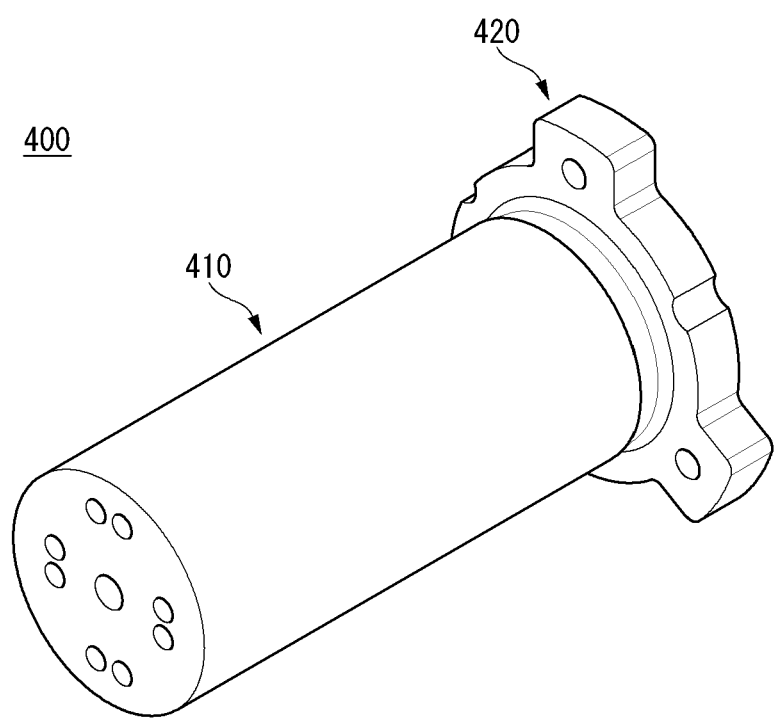
FIG. 12 is a perspective view of a compressor according to a third embodiment.
Figure 13:
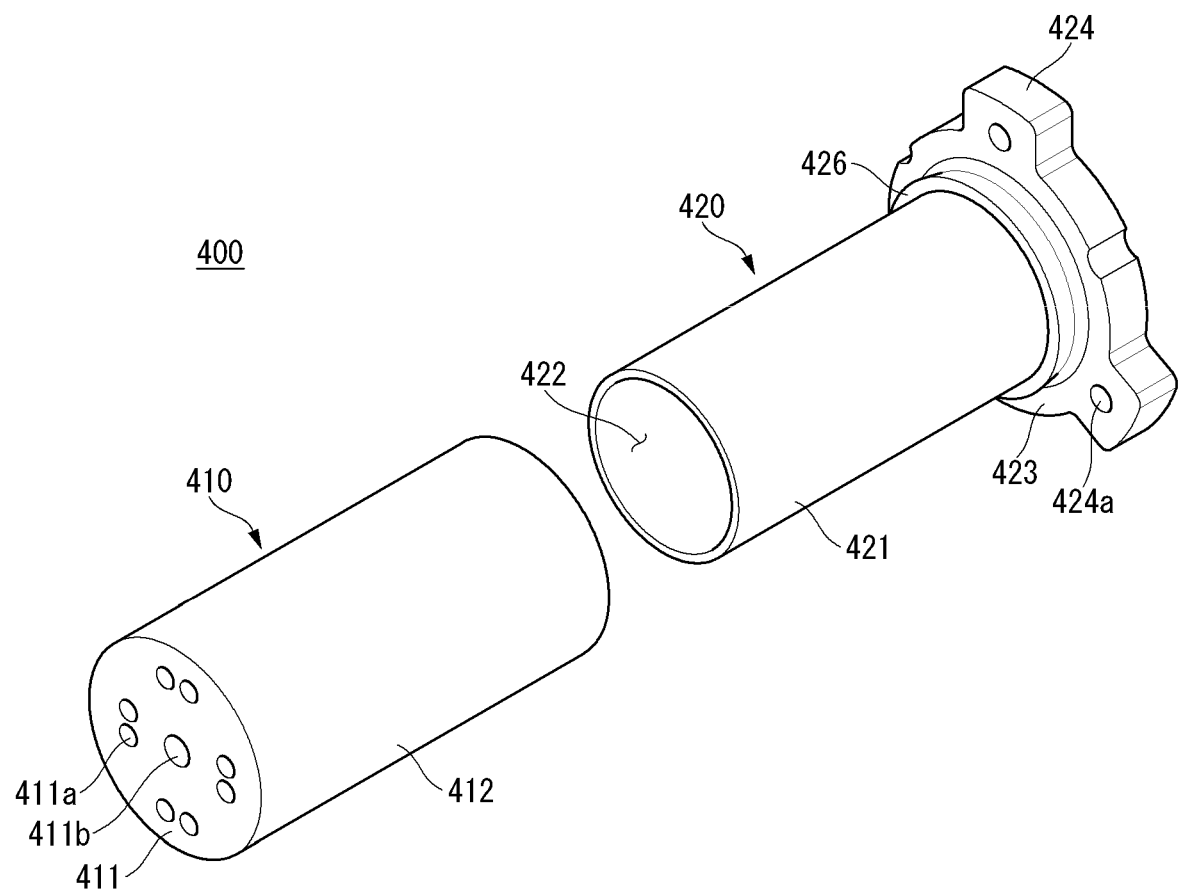
FIG. 13 is an exploded perspective view of FIG. 12.

FIG. 12 is a perspective view of a compressor according to a third embodiment. FIG. 13 is an exploded perspective view of FIG. 12, and FIG. 14 is a cross-sectional view of FIG. 12.

Figure 14:
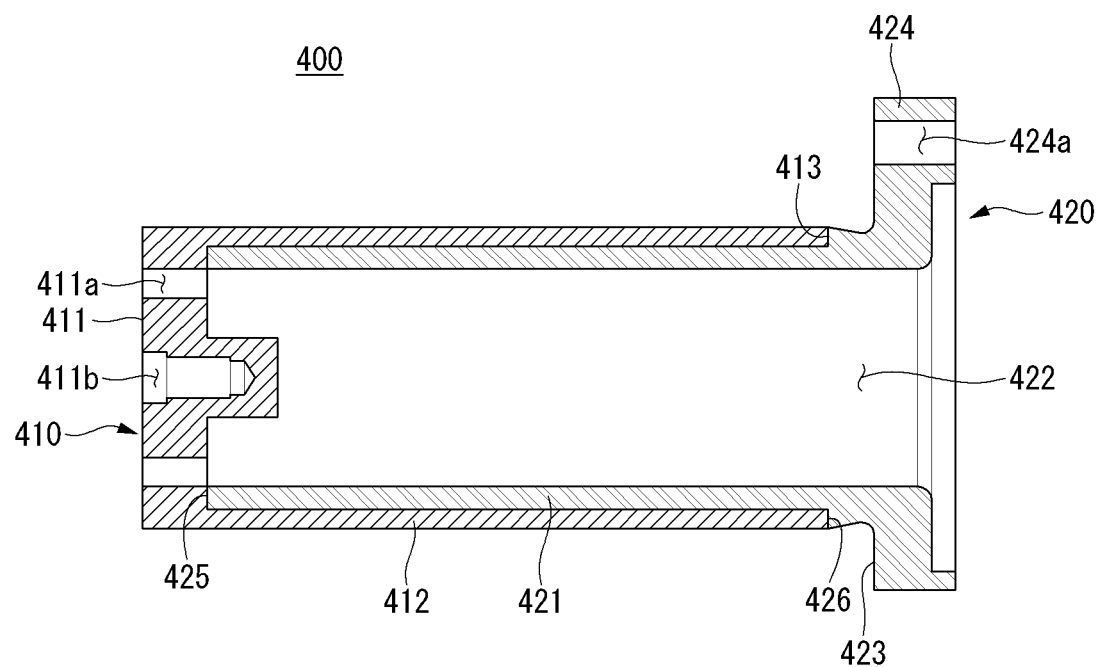
FIG. 14 is a cross-sectional view of FIG. 12.

Referring to FIGS. 12 to 14, in a compressor according to a third embodiment, a piston 400 includes a body portion 420 that is slid within a cylinder 140 and a bearing portion 410 provided to surround a cylindrical portion 421 of the body portion 420 and facing an inner circumferential surface of the cylinder 140 and provided with a compression surface 411.

The body portion 420 includes a cylindrical portion 421 provided in a hollow cylindrical shape defining an inner space 422 and a flange portion 423 disposed behind the cylindrical portion 421.

The body portion 420 may transfer a refrigerant provided from a muffler unit (see reference numeral 160 in FIG. 1) disposed at a rear side to a suction space 102 provided in the inner space 422 of the body portion 420. For example, an inner guide (see reference numeral 162 in FIG. 1) of a muffler unit 160 may be disposed to be accommodated in the inner space 422, and a refrigerant may flow into the suction space 102 through the inner guide 162.

The bearing portion 410 may include a compression surface 411 in which a suction port 411a is provided in a front side thereof and a bearing surface 412 provided in a cylindrical shape that is long in an axial direction to correspond to a shape of an inner wall of the cylinder 140. The bearing surface 412 may extend backward from an outer circumference of the compression surface 411.

The compression surface 411 is provided with a plurality of suction ports 411a in a circumferential direction, and a coupling hole 411b through which a coupling member is coupled to couple a suction valve 155 is defined in a center of the compression surface 411.

The bearing portion 410 is provided to surround the cylindrical portion 421 of the body portion 420 and has a predetermined thickness.

An outer circumferential surface of the bearing portion 410 may be provided as a bearing surface 412. That is, a bearing gas provided in the cylinder 140 may be filled between the bearing surface 412 and the inner circumferential surface of the cylinder 140 to lift the piston 400, thereby preventing the piston 400 and the cylinder 140 from being in contact with each other.

Nevertheless, the bearing surface 412 may cause friction or impact with the inner wall of the cylinder 140 due to external force or an alignment error. Therefore, to prevent this limitations, surface treatment may be performed on the bearing surface 412. Abrasion resistance, lubricity, or heat resistance may be improved through the surface treatment.

The surface treatment performed on the bearing portion 410 may be performed on the compression surface 411 as well as the bearing surface 412. Heat resistance of the compression surface 411 may be improved to improve compression efficiency.

The surface treatment of the bearing portion 410 may use one or more of diamond like carbon (DLC), Teflon (PTFE), a nickel-phosphorus alloy material, and an anodizing layer.

The bearing portion 410 and the body portion 420 may be coupled to each other through a boding process, for example, may be bonded to each other by using an anaerobic adhesive or an adhesive such as epoxy. Since the bonding process rather than a press-fitting process is performed, the bearing portion 410 may be prevented from being deformed by stress generated during the press-fitting. Also, the refrigerant may be prevented from leaking through a gap generated between two metal materials during the press-fitting.

The flange portion 423 is provided to transfer a refrigerant provided from a muffler unit (see 160 in FIG. 1) disposed at a rear side to an inner space of the body portion 310. For example, an inner guide (see reference numeral 162 in FIG. 1) of the muffler unit 160 may be accommodated in the body portion 420, and the refrigerant may be introduced into suction spaces 102 and 102 defined in the body portion 420 through the inner guide 162.

The flange portion 423 is provided in the form of a flange expanded outward in the radial direction from the rear side of the cylindrical portion 421 of the body portion 420. In a state in which the piston 400 is coupled to the cylinder 140, the flange portion 423 may be disposed behind the cylinder 140.

The flange portion 423 is provided with at least one coupling portion 424 coupled to a magnet frame (see reference numeral 136 in FIG. 1) or a spring support (see reference numeral 119 in FIG. 1). The coupling portion 424 may be provided in plurality. The plurality of coupling portions 424 may protrude outward in the radial direction of the flange portion 423 and disposed at regular intervals in a circumferential direction. For example, three coupling portions 424 may be disposed on the flange portion 423 at an interval of about 120 degrees.

The coupling portion 424 forms a coupling hole 424a for integrally fastening with the magnet frame 136 disposed at the rear of the flange portion 423. The magnet frame 136 may also have a coupling hole corresponding to the coupling hole 424a of the flange portion 423. The flange portion 423 and the magnet frame 136 may be integrally coupled to each other by allowing a pin or a screw to pass through the coupling hole.

An inner circumferential surface of the bearing portion 410 may be in close contact with and bonded to an outer circumferential surface of the cylindrical portion 421 of the body portion 420. The bearing portion 410 may be mounted on the body portion 420 in a manner using an adhesive.

In the state in which the bearing portion 410 is bonded to the body portion 420, a front end surface 425 of the body portion 420 may be supported on the inner surface of the bearing portion 320. Alternatively, in the state in which the bearing portion 410 is bonded to the body portion 420, a rear surface 413 of the bearing portion 410 may be supported in front of a support surface 426 of the body portion 420.

The support surface 426 of the body portion 420 may be disposed in front of the flange portion 423 and may be provided to provide a stepped portion radially outward from the cylindrical portion 421.

In the state in which the rear surface 413 of the bearing portion 410 is seated and bonded to the support surface 426 of the body portion 420, an outer surface of the body portion 420 on which the support surface 426 is defined and an outer surface of the bearing portion 410 may define the same surface.

Figure 15:
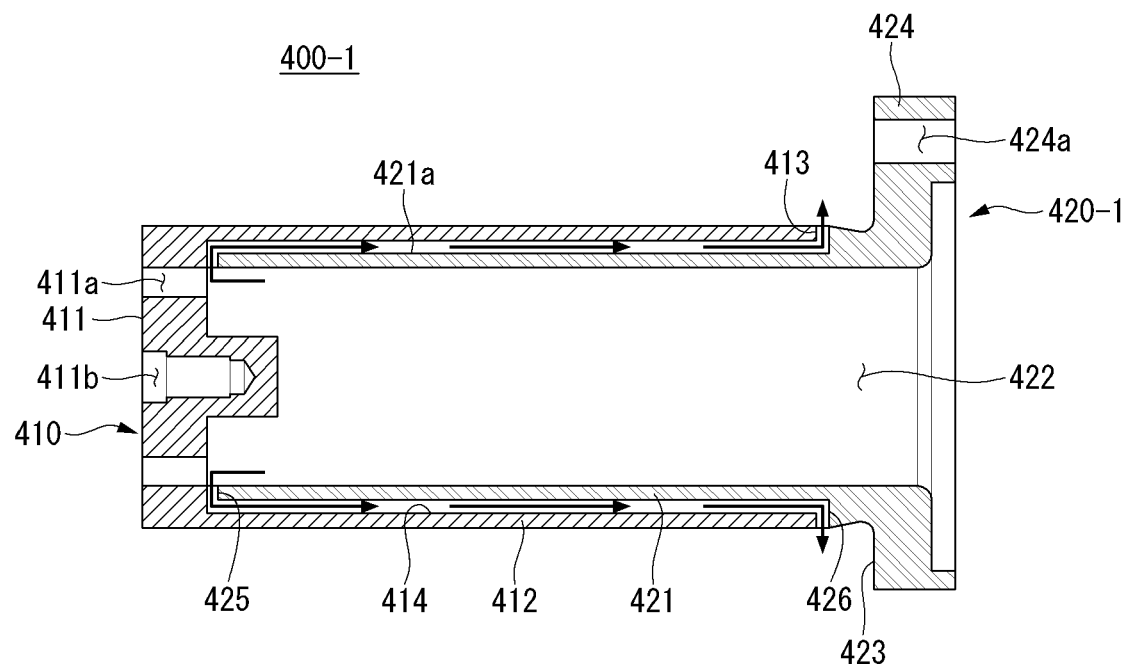
FIG. 15 is a cross-sectional view illustrating a modified example of FIG. 14.

FIG. 15 is a cross-sectional view illustrating a modified example of FIG. 14.

Referring to FIG. 15, a piston 400-1 according to a modified embodiment may include a heat dissipation passage through which a high-temperature refrigerant gas generated in a body portion 420-1 is discharged to the outside of a piston 400-1, or a low-temperature refrigerant gas outside the piston 400-1 is introduced into a body portion 420-1.

The heat dissipation passage may be disposed between a portion 421a of an outer circumferential surface of a cylindrical portion 421 of the body portion 420-1 and a portion of an inner circumferential surface 414 of a bearing portion 410.

In addition, the heat dissipation passage may be further provided between a portion of a front end surface 425 of the body portion 420-1 and a portion of a rear surface facing a compression surface 411 of the bearing portion 410.

In addition, the heat dissipation flow path may define a gap or passage between a portion of the rear surface 413 of the bearing portion 410 and a portion of a support surface 426 of the body portion 420.

The heat dissipation passage may be understood as a portion of the suction space 102. In other words, the suction space 102 may be divided into an inner space in a radial direction and an outer space in the radial direction with respect to the body portion 420-1. The heat dissipation passage corresponds to a space defined outside the body portion 420-1 in the radial direction.

Here, the heat dissipation passage may communicate with the outside of the piston 400-1 and the suction space 102. A refrigerant filled in the outside of the piston 400-1, that is, the inside of an accommodation space (see reference numeral 101 in FIG. 1) may flow through the heat dissipation passage. The refrigerant filled in the accommodation space 101 may correspond to a refrigerant having a relatively low temperature and pressure. The refrigerant may be introduced into and discharged from the heat dissipation passage according to a reciprocating motion of the piston 400-1. Accordingly, there is an effect of reducing a temperature of the piston 400-1.

As a result, the refrigerant suctioned through the suction muffler 161 may flow inside the body portion 420-1 in the radial direction, and the refrigerant filled in the accommodation space 101 may flow outside in the radial direction. In addition, it may be understood that the heat dissipation passage is divided into two spaces through which refrigerants having different properties flow.

The heat dissipation passage may be provided in a slit shape. For example, the cylindrical portion 421 of the body portion 420-1 may have a slit defined in an outer circumferential surface in an axial direction, and a plurality of slits may be provided in parallel in the circumferential direction.

The slit may communicate with the inner space 422 through a front end surface 425 of the body portion 420-1. Here, a portion of the front end surface 425 of the body portion 420-1 may be supported by the bearing portion 410, and another portion may communicate with the heat dissipation passage.

The slit may communicate with an external space 101 through the support surface 426 of the body portion 420-1. Here, a portion of the support surface 426 of the body portion 420-1 may be supported by the rear surface 413 of the bearing portion 410, and another portion may communicate with the heat dissipation passage.

Some or other embodiments described above are not mutually exclusive or distinct. Some or other embodiments described above may have their respective configurations or functions, which are used together or combined with each other.

For example, it means that a configuration A described in a specific embodiment and/or a drawing may be combined with a configuration B described in another embodiment and/or a drawing. That is, even if the combination between the components is not directly described, the combination is possible except for the case where the combination is not described.

The detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

In the piston used in the compressor according to the embodiment, only the tube-shaped bearing portion may be separately surface-treated to be increasingly inserted into the surface treatment equipment, and the surface treatment may be performed without using a separate jig.

In addition, according to at least one of the embodiments, since the flange portion is not inserted in the surface treatment equipment, the uniform quality may be achieved without plasma interference.

In addition, according to at least one of the embodiments, the flange portion may be omitted to be coupled to other components without bolt-coupling.

In addition, according to at least one of the embodiments, the adhesive may be used when bonding the bearing portion, the gap between the components may be removed to prevent the leakage, thereby maintaining the compression efficiency.

In addition, according to at least one of the embodiments, the bearing portion on which the surface treatment is performed may be bonded and coupled to the piston structure to simplify the process and reduce the manufacturing costs.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A piston for a compressor, comprising:
   a bearing portion that defines a suction space configured to receive refrigerant, and that includes a bearing surface facing an inner circumferential surface of the cylinder;
   a head portion that is coupled to a first opening of the bearing portion and that defines a plurality of suction ports that fluidly communicate with the suction space, the head portion having a compression surface that faces a compression space and the head portion being configured to compress the refrigerant in the compression space; and
   a flange portion that is coupled to a second opening of the bearing portion and that defines a passage through which the refrigerant is introduced from a muffler to the suction space, the flange portion being coupled to a driver and configured to transmit a driving force from the driver to the piston, wherein the second opening of the bearing portion is disposed opposite to the first opening of the bearing portion,
   wherein the bearing surface is treated to improve abrasion resistance, and
   wherein the bearing portion is bonded to the head portion and the flange portion.

2. The piston according to claim 1, wherein an adhesive is disposed at an interface between the bearing portion and the head portion or at an interface between the bearing portion and the flange portion.

3. The piston according to claim 2, wherein the adhesive comprises an anaerobic adhesive or an epoxy adhesive.

4. The piston according to claim 1, wherein the bearing surface of the bearing portion is laminated with a surface treatment layer configured to improve the abrasion resistance.

5. The piston according to claim 4, wherein the surface treatment layer comprises one or more of diamond like carbon (DLC), Teflon (PTFE), a nickel-phosphorus alloy material, and an anodizing layer.

6. The piston according to claim 1, wherein an outer circumferential surface of the head portion contacts an inner circumferential surface of the bearing portion, and
   wherein the compression surface of the head portion is flush with an end surface of the bearing portion at the first opening of the bearing portion.

7. The piston according to claim 6, wherein the plurality of suction ports are spaced radially inward from the inner circumferential surface of the bearing portion.

8. The piston according to claim 6, wherein the plurality of suction ports are partially defined by the inner circumferential surface of the bearing portion.

9. The piston according to claim 6, wherein the plurality of suction ports is recessed inward from the outer circumferential surface of the head portion in a radial direction.

10. The piston according to claim 6, wherein the head portion comprises:
    an insertion portion that is inserted to the first opening of the bearing portion and coupled to the bearing portion; and
    a front seating portion that extends radially outward from the insertion portion and that is seated on the end surface of the bearing portion.

11. A piston for a compressor, comprising:
    a bearing portion that defines a suction space configured to receive refrigerant, and that includes a bearing surface facing an inner circumferential surface of the cylinder;
    a head portion that is coupled to a first opening of the bearing portion and that defines a plurality of suction ports that fluidly communicate with the suction space, the head portion having a compression surface that faces a compression space and the head portion being configured to compress the refrigerant in the compression space; and
    a flange portion that is coupled to a second opening of the bearing portion and that defines a passage through which the refrigerant is introduced from a muffler to the suction space, the flange portion being coupled to a driver and configured to transmit a driving force from the driver to the piston, wherein the second opening of the bearing portion is disposed opposite to the first opening of the bearing portion,
    wherein the bearing surface is treated to improve abrasion resistance,
    wherein the bearing portion includes a seating portion that is defined at the inner circumferential surface of the bearing portion and that receives the head portion, and
    wherein the seating portion includes a stepped portion on which the head portion is seated.

12. A piston for a compressor, comprising:
    a body portion comprising a cylindrical portion that defines a suction space configured to receive refrigerant; and
    a bearing portion that has an inner diameter corresponding to an outer diameter of the body portion, that surrounds an outer circumferential surface of the cylindrical portion, and that includes a bearing surface facing an inner circumferential surface of the cylinder, wherein the bearing surface is treated to improve abrasion resistance, and wherein an adhesive is disposed at an interface between the bearing portion and the body portion.

13. The piston according to claim 12, wherein the bearing portion is bonded to the body portion.

14. The piston according to claim 12, wherein the adhesive comprises an anaerobic adhesive or an epoxy adhesive.

15. The piston according to claim 12, wherein the bearing surface of the bearing portion is laminated with a surface treatment layer configured to improve the abrasion resistance.

16. The piston according to claim 15, wherein the surface treatment layer comprises one or more of diamond like carbon (DLC), Teflon (PTFE), a nickel-phosphorus alloy material, and an anodizing layer.

17. The piston according to claim 12, further comprising a head portion that is integral with the body portion and defines a plurality of suction ports that fluidly communicate with the suction space, the head portion having a compression surface that faces a compression space and the head portion being configured to compress the refrigerant in the compression space.

18. The piston according to claim 12, further comprising a head portion that is integral with the bearing portion and defines a plurality of suction ports that fluidly communicate with the suction space, the head portion having a compression surface that faces a compression space and the head portion being configured to compress the refrigerant in the compression space.

* * * * *